(12) United States Patent
Takigawa

(10) Patent No.: US 10,621,545 B2
(45) Date of Patent: Apr. 14, 2020

(54) INVENTORY MANAGEMENT SYSTEM HAVING FUNCTIONS OF PERFORMING INVENTORY MANAGEMENT AND PREVENTIVE MAINTENANCE

(71) Applicant: FANUC CORPORATION, Yamanashi (JP)

(72) Inventor: Hiroshi Takigawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 15/888,131

(22) Filed: Feb. 5, 2018

(65) Prior Publication Data

US 2018/0247256 A1     Aug. 30, 2018

(30) Foreign Application Priority Data

Feb. 28, 2017   (JP) .................................. 2017-037178

(51) Int. Cl.
*G06Q 10/08*     (2012.01)
*G06N 20/00*     (2019.01)
(Continued)

(52) U.S. Cl.
CPC ........... *G06Q 10/087* (2013.01); *G06N 5/045* (2013.01); *G06N 7/005* (2013.01); *G06N 20/00* (2019.01); *G06N 20/20* (2019.01); *H01S 3/11* (2013.01); *H01S 3/1312* (2013.01); *H01S 3/1317* (2013.01); *H01S 3/23* (2013.01);
(Continued)

(58) Field of Classification Search
CPC ...... G06Q 10/087; G06N 5/045; G06N 20/20; G06N 20/00; G06N 7/005; G06N 3/006; H01S 3/1317; H01S 3/1312; H01S 3/11; H01S 3/23; H01S 3/10069; H01S 3/02;
(Continued)

(56) References Cited

U.S. PATENT DOCUMENTS 7,987,108 B2 *  7/2011  Wetzer ............... G05B 23/0283
                                                        705/7.12
8,190,543 B2 *  5/2012  Kaushal ............. G05B 13/0265
                                                        706/45
(Continued)

FOREIGN PATENT DOCUMENTS

CN         103632214 A       3/2014
CN         105046370 A       11/2015
(Continued)

*Primary Examiner* — Ashford S Hayles
(74) *Attorney, Agent, or Firm* — Hauptman Ham, LLP

(57) ABSTRACT

An inventory management system includes a plurality of apparatuses, an information management device connected to the apparatuses, and an information processor. The information processor calculates the sum of cumulative failure rates that is the sum value of the cumulative failure rates of all of designated components having the same specifications used in the apparatuses at a certain point in time, in consideration of an acceleration depending on a driving condition with respect to a standard cumulative failure rate of each type of the designated components having the same specifications used in the apparatuses under a standard driving condition, and calculates the appropriate inventory quantity of the designated components based on the calculated sum of the cumulative failure rates.

13 Claims, 25 Drawing Sheets

(51) Int. Cl.
*H01S 3/131* (2006.01)
*G06N 5/04* (2006.01)
*G06N 20/20* (2019.01)
*G06N 7/00* (2006.01)
*H01S 3/11* (2006.01)
*H01S 3/23* (2006.01)
*H01S 3/02* (2006.01)
*H01S 3/10* (2006.01)
*G06N 3/00* (2006.01)
*H01S 3/13* (2006.01)
*H01S 3/00* (2006.01)
*H01S 3/04* (2006.01)

(52) U.S. Cl.
CPC ............ *G06N 3/006* (2013.01); *H01S 3/0014* (2013.01); *H01S 3/02* (2013.01); *H01S 3/0407* (2013.01); *H01S 3/10069* (2013.01); *H01S 3/1305* (2013.01); *H01S 3/2383* (2013.01)

(58) Field of Classification Search
CPC .... H01S 3/2383; H01S 3/1305; H01S 3/0407; H01S 3/0014
See application file for complete search history.

(56) References Cited

U.S. PATENT DOCUMENTS

| | | | | |
|---|---|---|---|---|
| 8,396,582 B2* | 3/2013 | Kaushal | ............ | G05B 13/0265 700/104 |
| 8,725,667 B2* | 5/2014 | Kaushal | ............ | G05B 13/0265 706/14 |
| 8,954,350 B2* | 2/2015 | Nagai | .................... | G06Q 10/00 705/28 |
| 9,336,510 B2* | 5/2016 | Dearing | ............ | G06Q 10/0833 |
| 9,824,060 B2* | 11/2017 | Yacout | .................... | G01D 3/10 |
| 10,345,775 B2* | 7/2019 | Westcott | ............. | G06F 17/5004 |
| 10,410,132 B2* | 9/2019 | Rastogi | .................. | G06N 7/005 |
| 2005/0149570 A1* | 7/2005 | Sasaki | .................... | G06Q 10/06 |
| 2011/0213636 A1* | 9/2011 | Sakuma | ............. | G05B 19/4183 705/7.25 |
| 2013/0151308 A1* | 6/2013 | Helms | .................. | G06Q 10/087 705/7.29 |
| 2013/0232094 A1* | 9/2013 | Anderson | .......... | G05B 23/0229 706/12 |
| 2016/0282229 A1* | 9/2016 | Qin | ....................... | G01M 17/08 |
| 2017/0109223 A1* | 4/2017 | Hofig | ................. | G05B 23/0283 |
| 2018/0174067 A1* | 6/2018 | Spiro | ....................... | G06K 9/00 |

FOREIGN PATENT DOCUMENTS

| | | |
|---|---|---|
| CN | 105117606 A | 12/2015 |
| CN | 105844050 A | 8/2016 |
| JP | 2004-295667 A | 10/2004 |
| JP | 2007-323148 A | 12/2007 |
| JP | 2010-113672 A | 5/2010 |
| JP | 2012-104058 A | 5/2012 |
| JP | 2013-538543 A | 10/2013 |
| WO | 2012/157040 A1 | 11/2012 |

* cited by examiner

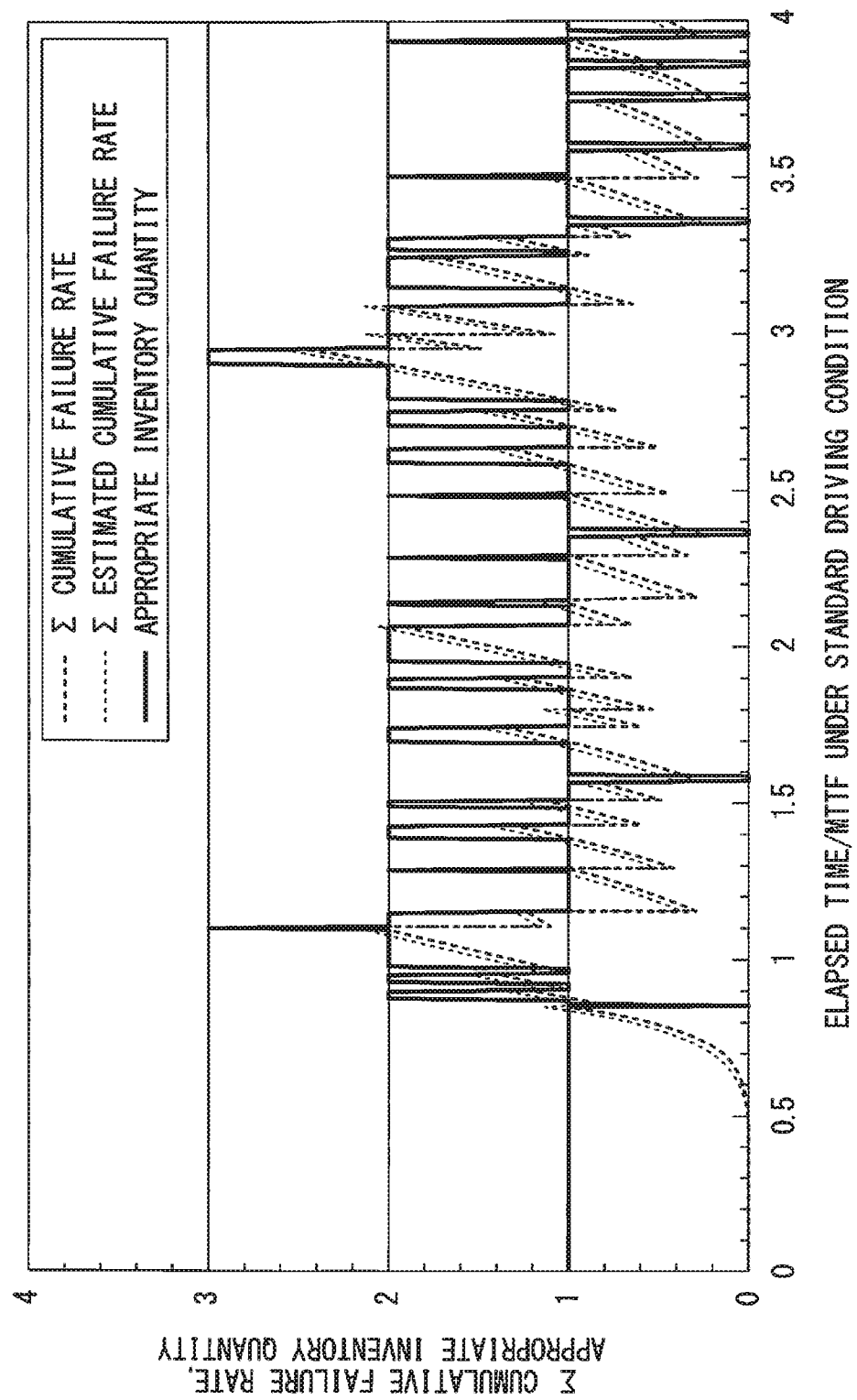
F I G. 5b

INVENTORY MANAGEMENT SYSTEM HAVING FUNCTIONS OF PERFORMING INVENTORY MANAGEMENT AND PREVENTIVE MAINTENANCE

RELATED APPLICATIONS

The present application claims priority to Japanese Patent Application No. 2017-037178 filed on Feb. 28, 2017, the disclosure of which is hereby incorporated by reference herein in its entirety.

BACKGROUND OF THE INVENTION

1. Field of the Invention

The present invention relates to an inventory management system having the functions of performing inventory management and preventive maintenance.

2. Description of Related Art

Malfunctions of apparatuses due to failures or damage of components of the apparatuses, frequently stop the apparatuses and produce stop periods during which the apparatuses are unusable. To prevent an increase in the stop frequency and the stop periods, the inventory quantity of replacement components of each apparatus is conventionally managed.

Even when an average failure rate (the number of failures per time), depending on a drive time of each component, is known to some degree, the failure rate may change in accordance with a driving condition, and hence it is generally difficult to predict a failure, unless there is an obvious sign that indicates when each component will fail. Therefore, excessive or insufficient inventory may frequently occur in inventory management for components of apparatuses.

When a component is expensive, excessive inventory is uneconomical. On the other hand, insufficient inventory quantity causes stopping of the apparatus until the delivery of a replacement component. When the apparatus is production equipment, a production process using the apparatus significantly delays, thus causing a significant loss. Thus, appropriate inventory management is required, in consideration of a failure showing no signs.

Since inventory management for maintenance components of apparatuses is an important technology, various related techniques are proposed (for example, Japanese Unexamined Patent Publication (Kokai) Nos. 2010-113672, 2004-295667 and 2012-104058).

SUMMARY OF THE INVENTION

However, no inventory management system having an inventory management function that considers a failure showing no signs has been conventionally proposed. Thus, it has been impossible to precisely estimate the number of failures showing no signs, and to perform appropriate inventory management. Therefore, inventory management for components is required in consideration of a failure showing no signs.

According to an aspect of this disclosure, an inventory management system includes a plurality of apparatuses and an information management device connected to the apparatuses. The apparatuses each have replaceable common components shareable between the apparatuses. The common components having the same specifications used in the apparatuses are designated as components under inventory management.

The inventory management system includes an information processor for calculating the sum of the cumulative failure rates that is the sum value of the cumulative failure rates of all of the designated components having the same specifications used in the apparatuses at a certain point in time, in consideration of an acceleration depending on a driving condition with respect to the standard cumulative failure rate of each type of the designated components having the same specifications used in the apparatuses under a standard driving condition, and calculating the appropriate inventory quantity of the designated components at the certain point in time based on the calculated sum of the cumulative failure rates.

The features and advantages of the present invention and other features and advantages will become more apparent from the following detailed description of preferred embodiments of the present invention along with the accompanying drawings.

BRIEF DESCRIPTION OF THE DRAWINGS

FIG. 5b is a graph showing an example of a variation in each of the sum of cumulative failure rates, the sum of estimated cumulative failure rates, and the appropriate inventory quantity, relative to an elapsed time, of a plurality of components having the same specifications whose dominant failures are wear-out failures, provided in apparatuses under inventory management;

DETAILED DESCRIPTION OF THE INVENTION

Figure 1:
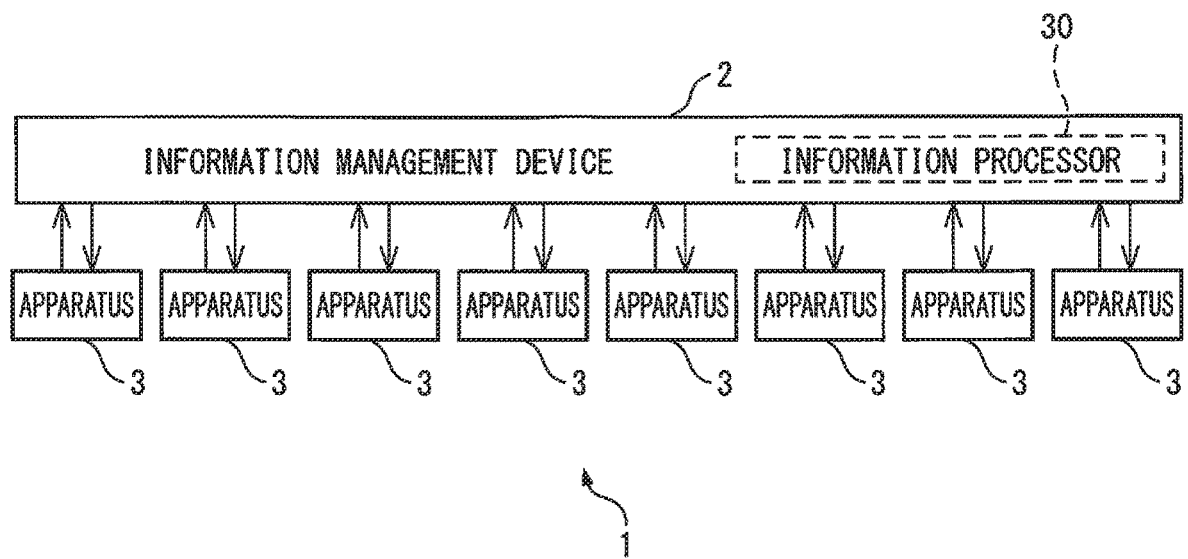
FIG. 1 is a block diagram showing the schematic configuration of an inventory management system according to an embodiment.

Next, embodiments of this disclosure will be described with reference to the drawings. In the reference drawings, the same reference numerals indicate the same or similar structural or functional components. For ease of understanding, the drawings are scaled appropriately. The embodiments shown in the drawings are just examples to embody the present invention, and the present invention is not limited to the embodiments shown.

FIG. 1 is a block diagram showing the schematic configuration of an inventory management system 1 according to an embodiment.

As shown in FIG. 1, the inventory management system 1 includes an information management device 2 and a plurality of apparatuses 3 connected to the information management device 2. The information management device 2 manages information to be supplied to or received from the apparatuses 3. More specifically, the information manager 2 is a device that collects state information of the apparatuses 3 from the apparatuses 3 through a communication controller, a memory, and the like of each apparatus 3 to perform recording, analysis, and the like of the state information in a centralized manner, to output required information.

The information management device 2 includes, for example, a communication network such as the Internet and an intranet and an information processor 30. Each of the apparatuses 3 and the information processor 30 is constituted of a computer, a server, or the like having a memory such as a ROM (read only memory) and a RAM (random access memory), a CPU (control processing unit), and a communication controller connected to each other through a bus. Furthermore, the functions and operations of the apparatuses 3 and the information processor 30 are each realized by cooperation of the CPU and the memory, which are mounted in the computer, the server, or the like, and a control program stored in the memory.

Apparatuses under inventory management and preventive maintenance are limited in general, and the target apparatuses 3 are installed in, for example, the same manufacturing cell, the same building, the same factory site, areas to which maintenance components can be delivered within an predetermined time period, or the like. This is because it makes no sense to have a replacement component, unless the replacement component cannot be delivered within a predetermined time period to the site of an apparatus that is stopped owing to a failure of a component or is in a non-working state. Thus, the inventory management system 1 according to this disclosure conducts inventory management of common components having the same specifications used in the two or more designated apparatuses 3.

Note that, the term "component" described in this specification and the scope of claims includes at least one of a component and a unit. The component denotes an element constituting a machine, electrical and electronic equipment, and the like. The unit denotes an assembly of elements.

The term "apparatus" described in this specification and the scope of claims includes at least one of an apparatus, a device, a machine and a facility. Furthermore, the term "the same specifications" described in this specification and the scope of claims includes meaning of approximately the same specifications in which the specifications are substantially the same, besides meaning that every specification is the same.

As is apparent from the following description, the inventory management system 1 according to this disclosure has to collect an enormous volume of information from each apparatus 3. Thus, a configuration such as a cloud computing system, which widely collects information from the apparatuses 3 through the Internet, applies an excessive load to a communication network, and makes it difficult to process the information from each apparatus 3 at a high speed in real time. Therefore, the information management device 2 constituting the inventory management system 1 is preferably disposed between the apparatuses 3 and the cloud (not shown), to perform management and processing of the information on a near side to apparatuses. However, in FIG. 1, a group of apparatuses 3 are connected to the information management device 2, as apparatuses under inventory management and preventive maintenance, but the present invention is not limited to FIG. 1. A plurality of apparatuses 3 divided into groups may be connected to the information management device 2, and the apparatuses 3 may be under inventory management and preventive maintenance on a group-by-group basis.

The apparatuses 3 connected to the information management device 2 have at least one type of replaceable common components that are used commonly in the apparatuses 3, and the common components are designated as components under inventory management. The components under inventory management (hereinafter referred to as designated components) are managed on the basis of each component group having the same specifications used in the apparatuses 3. However, a group of apparatuses 3 under inventory management and preventive maintenance do not necessarily have the same specifications.

Figure 2A:
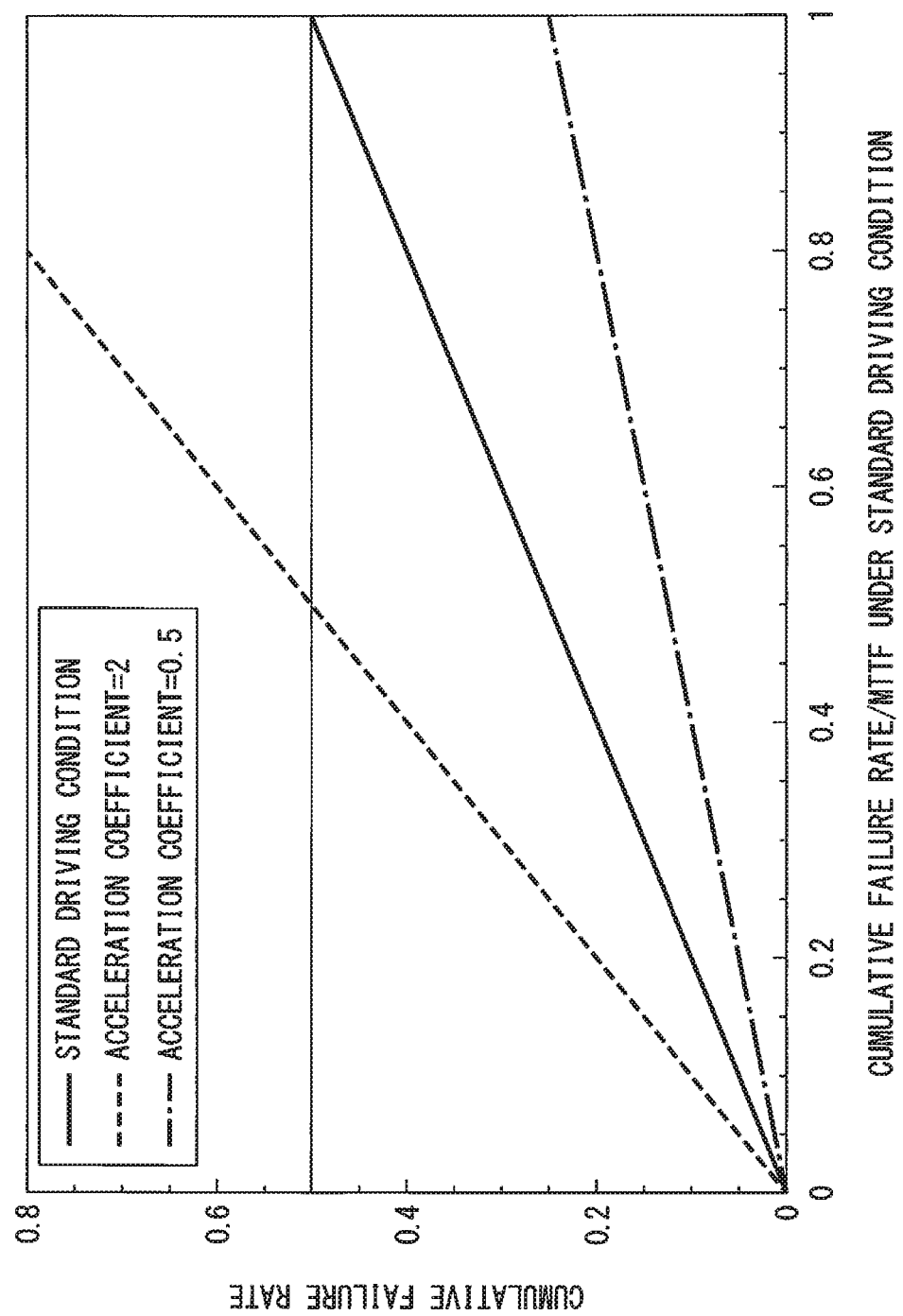
FIG. 2a is a graph showing an example of variations in the cumulative failure rate of a component whose dominant failure is a random failure, relative to a drive time.
Figure 2B:
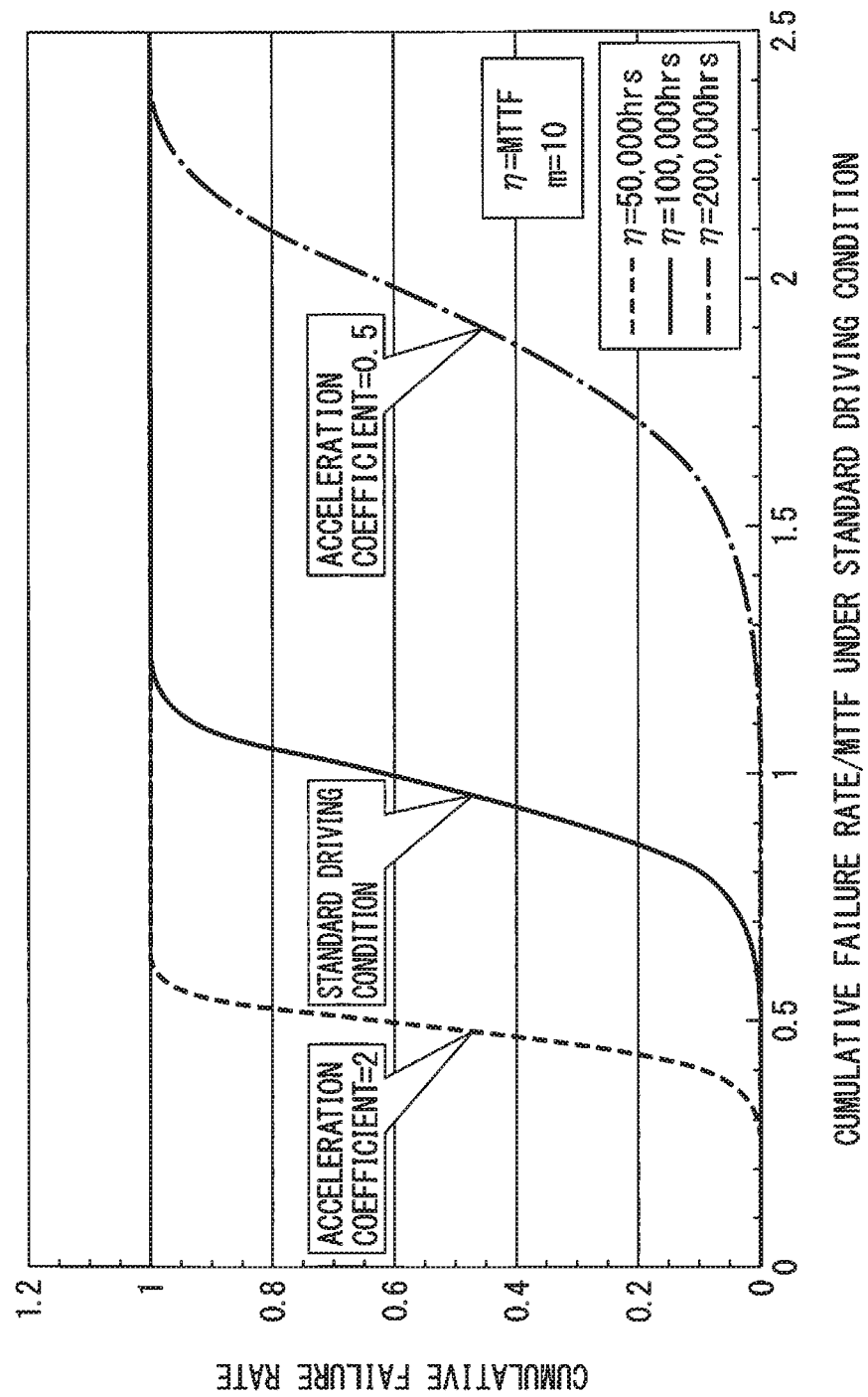
FIG. 2b is a graph showing an example of variations in the cumulative failure rate of a component whose dominant failure is a wear-out failure, relative to a drive time.

As to one type of designated components having certain specifications, it is known that their cumulative failure rate, which is a drive-time integral of the failure rate (the number of failures per time) of the designated components, is represented by FIG. 2a or 2b. In this specification, the term "drive" is substituted for operation, energization, and the like, though the terms of operation, energization, and the like may be more suited to a state than the term "drive", depending on the type and usage of the designated components.

In both of FIGS. 2a and 2b, the horizontal axis represents value obtained by dividing the drive-time by MTTF (mean time to failure: average lifetime) of the designated components driven under standard driving conditions. FIG. 2a shows an example of the cumulative failure rate when a random failure is dominant. FIG. 2b shows an example of the cumulative failure rate when a wear-out failure is dominant.

In FIGS. 2a and 2b, solid lines represent the cumulative failure rate of the designated component used under the standard driving conditions. Broken lines represent the case where an acceleration coefficient of the cumulative failure rate is doubled owing to, for example, a higher drive voltage or a higher temperature than the standard driving conditions, and the cumulative failure rate reaches 0.5 in a half drive time. Alternate long and short dashed lines represent the case where an acceleration coefficient of the cumulative failure rate is halved owing to, for example, a lower drive voltage or a lower temperature than the standard driving condition, and the cumulative failure rate reaches 0.5 in a double drive time.

Figure 3:
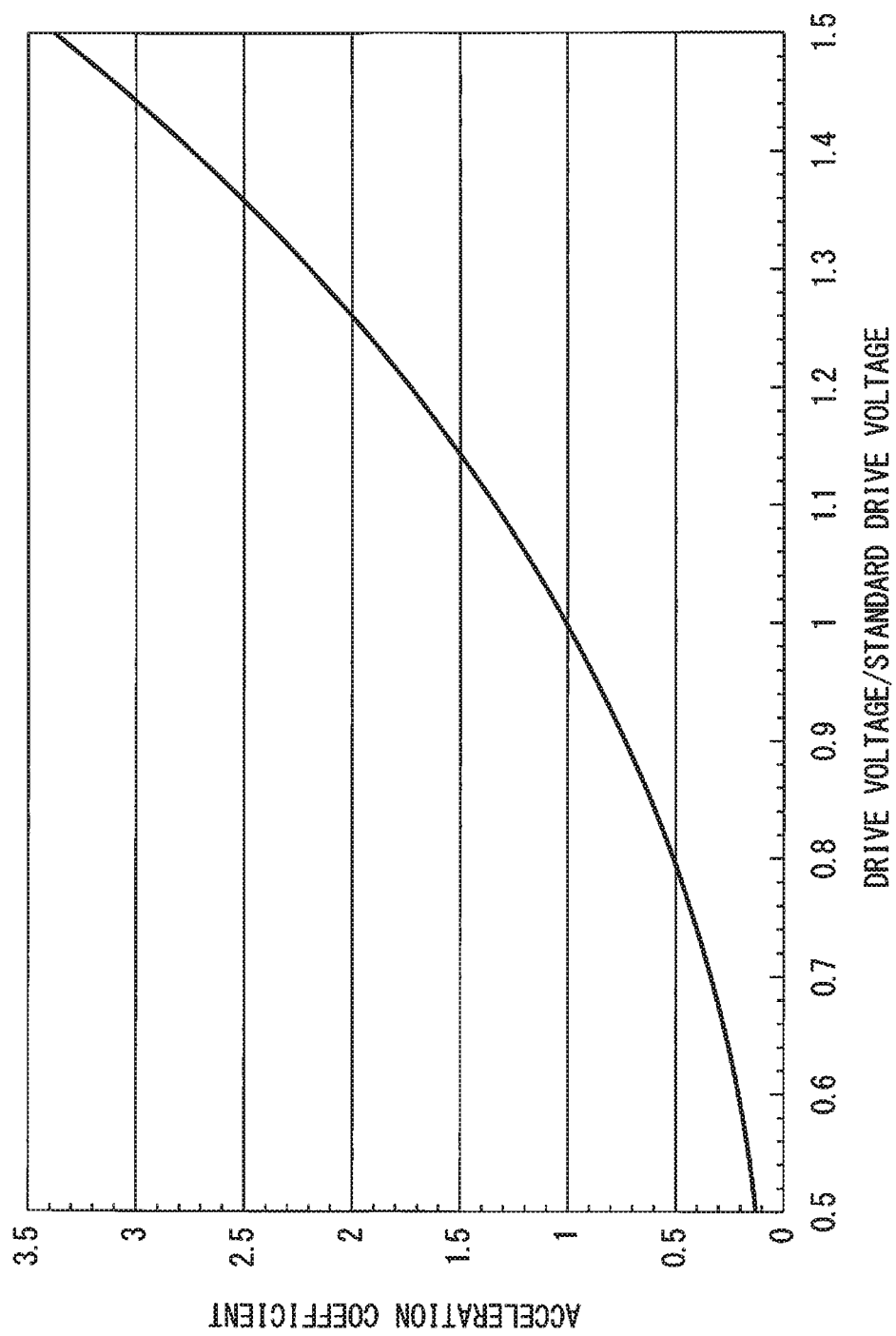
FIG. 3 is a graph showing an example of the relationship between a driving condition and an acceleration coefficient under the driving condition.

In either of FIGS. 2a and 2b, the drive time to when the cumulative failure rate reaches to a certain value (e.g. 0.5) is shortened or lengthened to 1/acceleration coefficient, by the acceleration coefficient. FIG. 3 shows an example of the relationship between the driving conditions and the acceleration coefficient. In the example of FIG. 3, drive voltage is used as the driving condition, and the acceleration coefficient is the third power of "drive voltage/standard drive voltage". As the driving condition that accelerates an increase in the cumulative failure rate and the consumption of lifetime by driving, a drive current, a temperature, a temperature cycle, a vibration, and the like are known besides the drive voltage shown in FIG. 3. When the component is a light-emitting device, light output is a typical driving condition to accelerate an increase in the cumulative failure rate and the consumption of lifetime. To calculate an increase in the cumulative failure rate and the consumption of lifetime by driving, it is necessary to consider an acceleration coefficient for every accelerated driving condition, except for the case of the acceleration coefficient is almost 1.

When an acceleration coefficient that brings shortening or elongation of the time to when the cumulative failure rate reaches a certain value is required to be distinguished from the other acceleration coefficients, the acceleration coefficient is described as "first acceleration coefficient" in this specification.

Figure 4A:
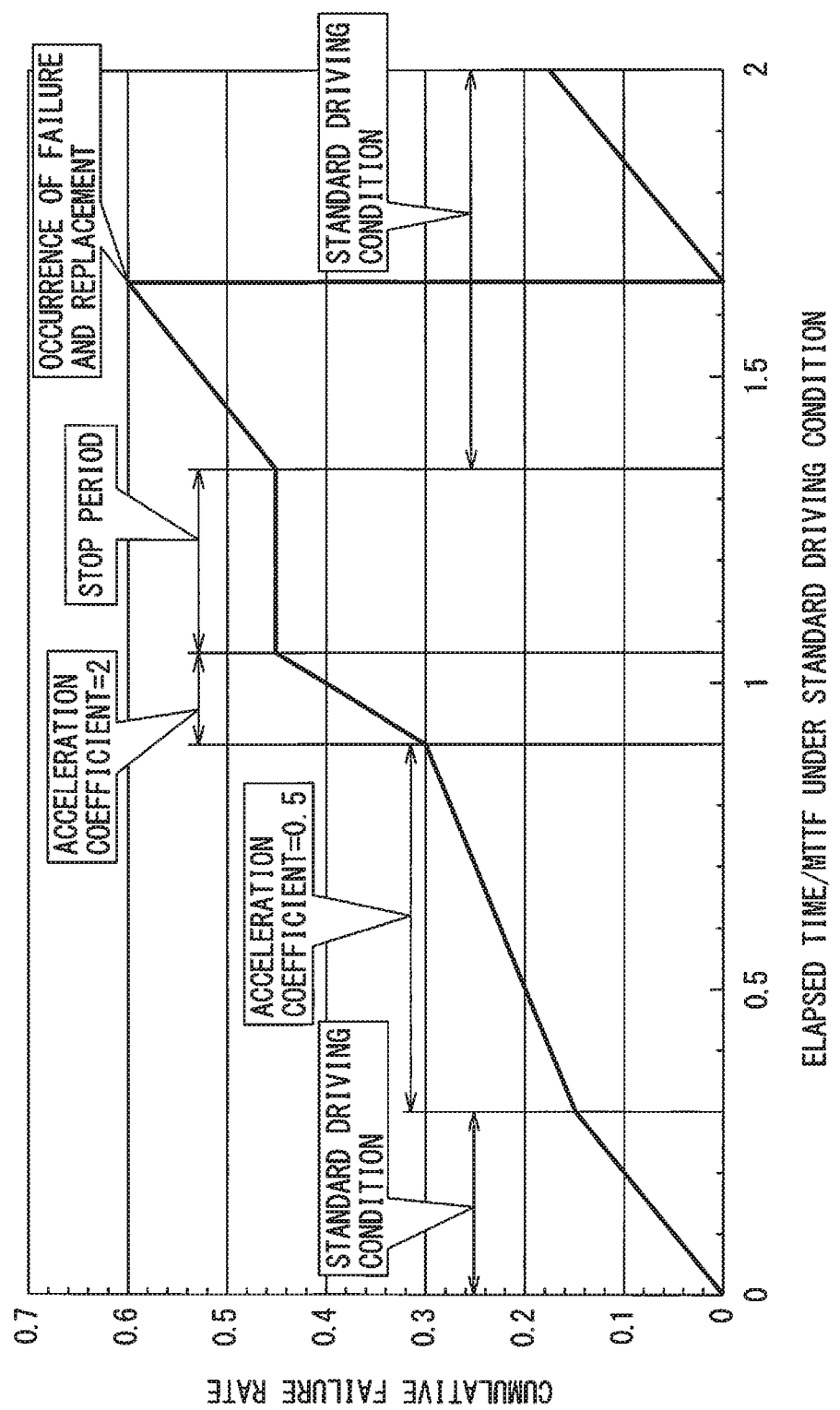
FIG. 4a is a graph showing an example of a variation in the cumulative failure rate of a component whose dominant failure is a random failure, relative to a drive time, when the component is operated under driving conditions having different acceleration coefficients.
Figure 4B:
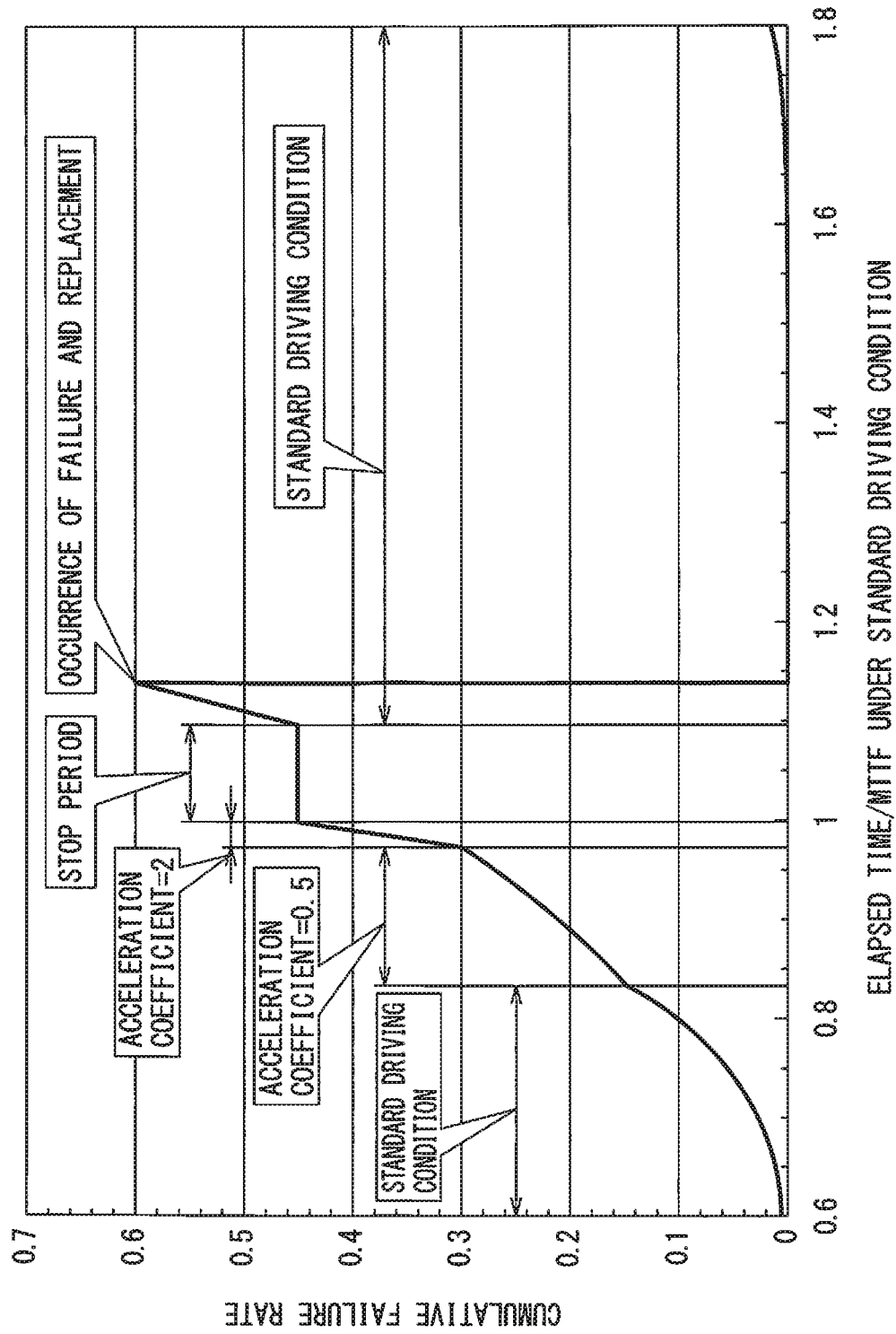
FIG. 4b is a graph showing an example of a variation in the cumulative failure rate of a component whose dominant failure is a wear-out failure, relative to a drive time, when the component is operated under driving conditions having different acceleration coefficients.

Each of FIGS. 4a and 4b is an example of a time variation in the cumulative failure rate of one of the designated components having the cumulative failure rate characteristics shown in FIGS. 2a and 2b. In both of FIGS. 4a and 4b, the horizontal axis represents a value that a lapse of time from the start of driving is divided by MTTF of the designated components driven under the standard driving condition. FIG. 4a shows an example of the cumulative failure rate, when a random failure is dominant. FIG. 4b shows an example of the cumulative failure rate, when a wear-out failure is dominant. MTTF is of the order of, for example, a hundred thousand hours. Although it is unnatural for an apparatus to continue driving for several tens of thousands of hours under an invariable driving condition and to stop driving for several tens of thousands of hours under an invariable driving condition, as shown in FIGS. 4a and 4b, for the sake of easy understanding, each of FIGS. 4a and 4b shows a case where the designated component is driven under the invariable driving conditions for a long time.

Each of FIGS. 4a and 4b is a graph of the cumulative failure rate, when the designated component is driven in the following procedure. First, as shown in FIGS. 4a and 4b, the designated component is driven under the standard driving condition. The driving condition is switched so as to have an acceleration coefficient of the cumulative failure rate of 0.5 at some point in time, and thereafter the driving condition is switched so as to have an acceleration coefficient of the cumulative failure rate of 2 at some point in time. After that, the designated component is not driven from some point in time in a stop period. While the designated component is driven again under the standard driving condition, a failure occurs, and the designated component is replaced with a new designated component. After the cumulative failure rate is reset to zero, the designated component is driven under the standard driving condition.

Upon switching the driving condition, the cumulative failure rate at the point in time is switched to the graph of the cumulative failure rate having an acceleration coefficient of a new driving condition (shown in, for example, FIGS. 2a and 2b), and thus the cumulative failure rate increases with time. Therefore, FIGS. 4a and 4b show examples of the cumulative failure rate in consideration of an acceleration coefficient depending on the driving condition, relative to a standard cumulative failure rate of the designated components having the same specifications under the standard driving condition. As is apparent from FIGS. 4a and 4b, the cumulative failure rate is widely different from the actual rate, without consideration of the acceleration coefficient depending on the driving condition.

As a matter of course, even if the cumulative failure rate of a designated component is known in consideration of an acceleration coefficient depending on a driving condition, the time when the component actually fails depends on a probability, and is not known until it happens. However, calculating the sum of the cumulative failure rates of all designated components having the same specifications used in a group of apparatuses 3 under inventory management and preventive maintenance, in consideration of acceleration coefficients depending on driving conditions (i.e., the sum of cumulative failure rates), as shown in FIGS. 5a and 5b, allows an index to the appropriate inventory quantity of designated components to be obtained.

Figure 5A:
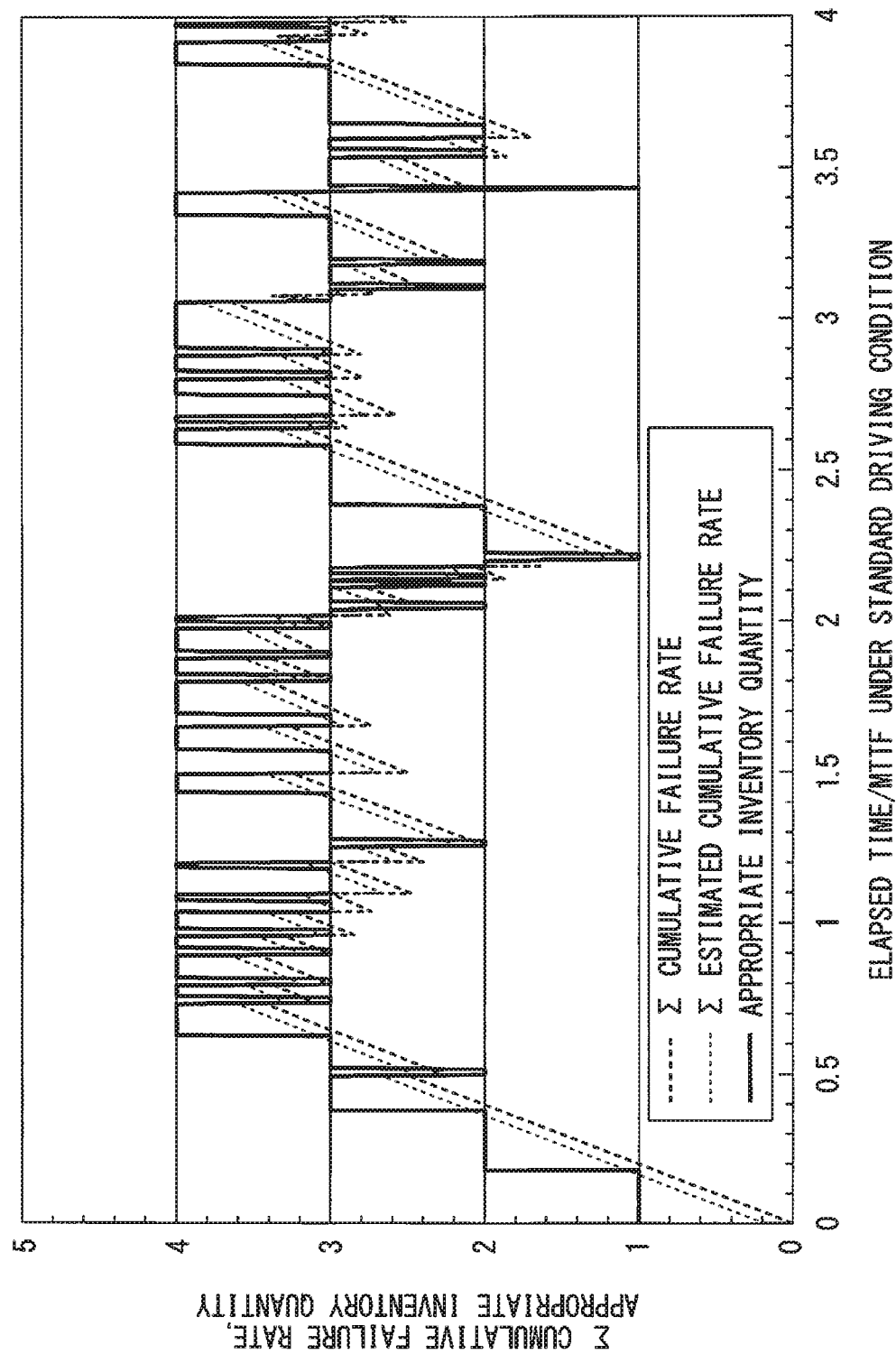
FIG. 5a is a graph showing an example of a variation in each of the sum of cumulative failure rates, the sum of estimated cumulative failure rates, and the appropriate inventory quantity, relative to an elapsed time, of a plurality of components having the same specifications whose dominant failures are random failures, provided in apparatuses under inventory management.

FIG. 5a is a graph showing an example of a time variation in the sum of cumulative failure rates of designated components whose dominant failures are random failures and the appropriate inventory quantity. FIG. 5b is a graph showing an example of a time variation in the sum of cumulative failure rates of designated components whose dominant failures are wear-out failures and the appropriate inventory quantity. In each of FIGS. 5a and 5b, the thick broken line represents the sum of cumulative failure rates (i.e., Σ cumulative failure rate) of all designated components having the same specifications used in a group of apparatuses 3 under inventory management and preventive maintenance. The thin broken line represents the sum of estimated cumulative failure rates (i.e., Σ estimated cumulative failure rate), after a lapse of a delivery time (i.e., time required for delivery) of the designated components from a certain point in time.

As the sum of estimated cumulative failure rates, estimated cumulative failure rates after a lapse of a delivery time, which are estimated from time variations in the cumulative failure rates of the designated components having the same specifications, as shown in FIGS. 4a and 4b, are summed. The appropriate inventory quantity represented by the thick solid line in each of FIGS. 5a and 5b is a positive integer that the sum of estimated cumulative failure rates is rounded up, and in general, represents a history of the appropriately managed inventory quantity.

For the sake of easy understanding of the drawings, FIGS. 5a and 5b show the sums of cumulative failure rates of ten designated components having the same specifications driven under the same driving condition. In the example of FIG. 5a, driving of the ten components begins simultaneously from the beginning. On the other hand, in the example of FIG. 5b, driving begins for five of the ten components first, and the remaining five components are driven one by one at intervals of MTTF×0.1 with a delay of MTTF×0.3 from the beginning, in order to prevent the occurrence of a wide valley in the sum of cumulative failure rates owing to the small number of the components.

As shown in FIGS. 5a and 5b, the sum of the cumulative failure rates varies widely, because the number of the designated components is small when calculating the sum of cumulative failure rates, but the variation rate decreases with an increase in the number of the designated components. A delivery time is set long, i.e., at a one-fiftieth MTTF, so that the graphs of the sum of cumulative failure rates and the sum of estimated cumulative failure rates are seen separately. Due to the long delivery time, in the example of FIG. 5b, the inventory quantity is zero in quite long time periods.

In the conditions set as described above, management of the inventory quantity based on the sum of cumulative failure rates, in other words, making arrangements for replacement components, as soon as the actual inventory quantity becomes lower than the sum of estimated cumulative failure rates, prevents a situation in which when a designated component fails, there is no replacement component of the failing designated component. Therefore, the inventory quantity is managed in an appropriate manner.

Adding a sense that the inventory quantity is managed based on the sum of cumulative failure rates, for example, when the cumulative failure rate of each designated component is 0.01 and there are 1000 designated components having the same specifications, the sum of the cumulative failure rates is 10. This means that ten of the components could fail at any time on average, and at least ten replacement components of the designated components are required.

When the number of occurrences of failures is low, an increased number of components have been used for a long duration, and the number of occurrences of failures may increase thereafter. In this case, inventory management can be performed in consideration of the necessity to increase the inventory quantity.

Since the possibility of occurrence of a failure depends on a statistical probability, an actual result (the actual number of failures) varies more widely as the number of components (population) decreases. Therefore, in order to reduce the risk of insufficient inventory, a correction may be made, such that a predetermined number is added to the minimum required inventory quantity as a margin and a calculated number is designated as the appropriate inventory quantity, or the product of the minimum required inventory quantity and a predetermined ratio is added to the inventory quantity as a margin and a calculated number is designated as the appropriate inventory quantity. When the number of designated components is relatively small, the former management method in which the sum of the minimum required inventory quantity and a predetermined number is designated as the appropriate inventory quantity is preferable in most cases.

Figure 5C:
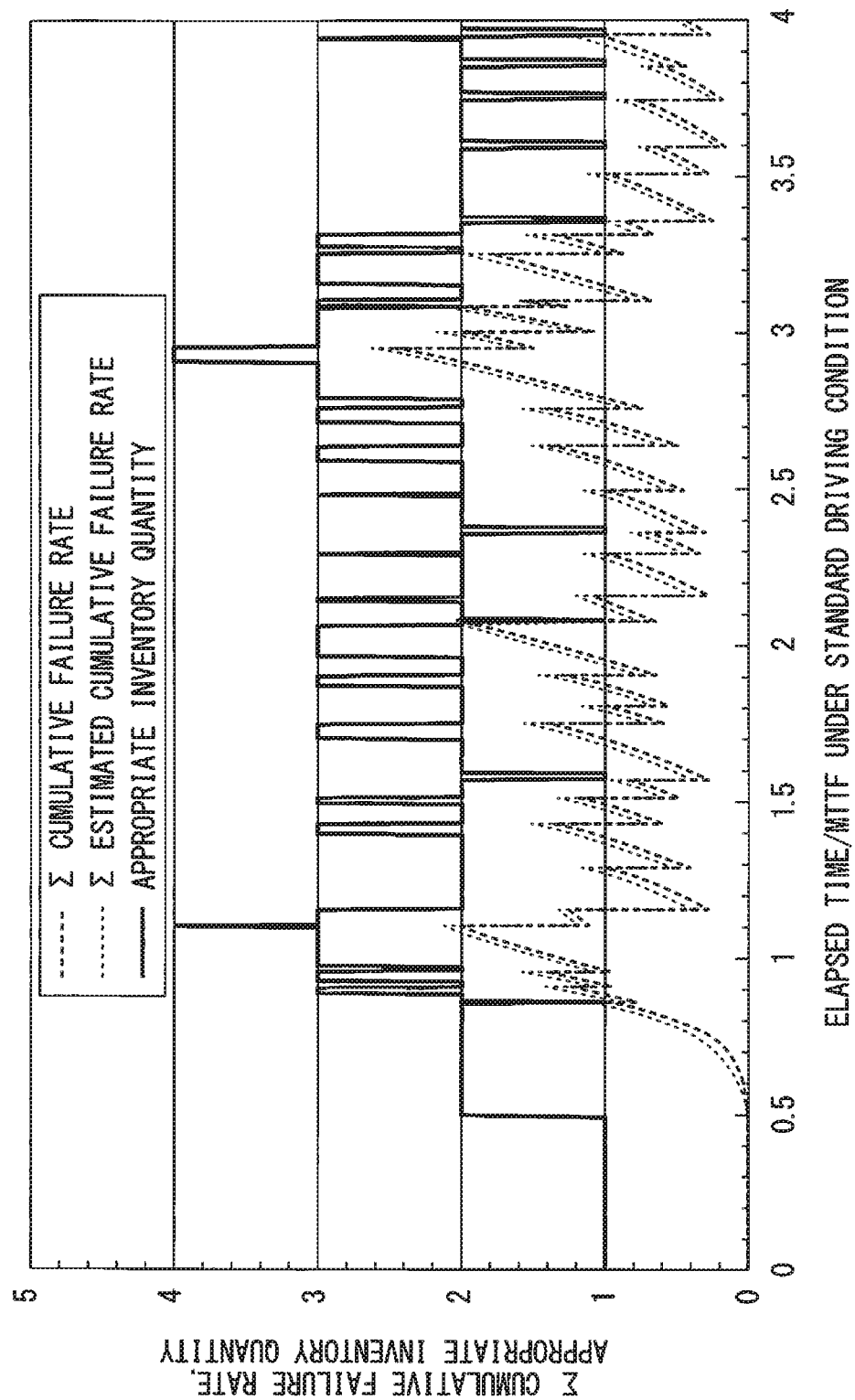
FIG. 5c is a graph when the appropriate inventory quantity is calculated by an equation of "appropriate inventory quantity≥sum of estimated cumulative failure rates+1", instead of FIG. 5b.

FIG. 5c represents the appropriate inventory quantity, when taking an inventory management method in which arrangements for a designated component are made as soon as the subtraction of the sum of estimated cumulative failure rates from the actual inventory quantity becomes equal to or lower than 1, with respect to the example of FIG. 5b, in other words, when taking the inventory management method in which arrangements for a designated component are made as soon as the actual inventory quantity becomes lower than the sum of estimated cumulative failure rates.

In the example of FIG. 5c, as compared with the example of FIG. 5b, the inventory quantity does not become zero in any time period. Although the inventory quantity is increased by almost 1 on average, the risk of a recovery delay of the apparatus owing to insufficient inventory is reduced. The margin may be changed on the basis of the type of designated components depending on their price and delivery time, in consideration of the balance between an increase in the inventory quantity and the risk of insufficient inventory. In general, the longer the delivery time and the less expensive the price, the larger margin is preferable.

Figure 6:
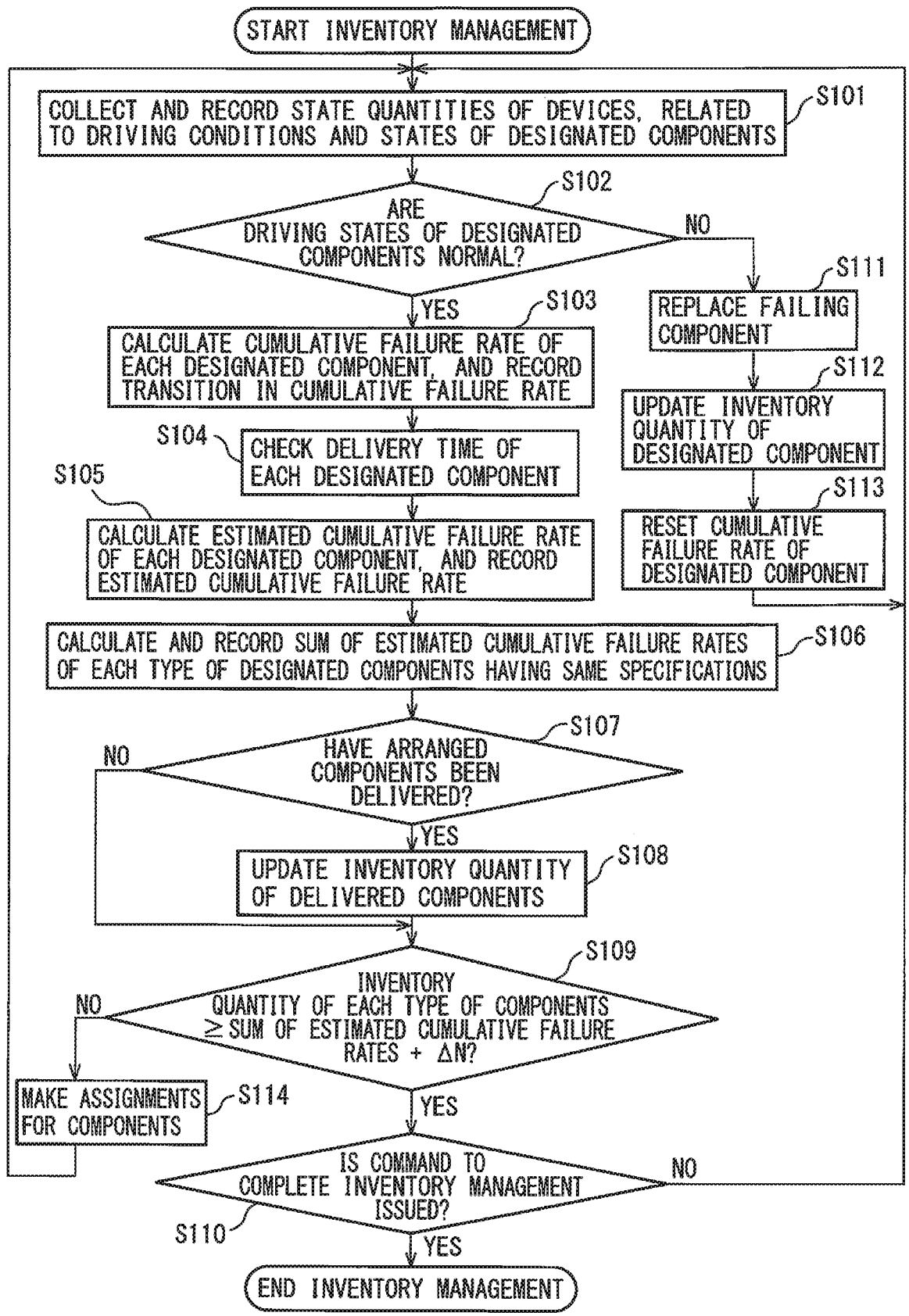
FIG. 6 is a flowchart showing an example of the operation of the inventory management system shown in FIG. 1.

FIG. 6 is a flowchart showing an example of the operation of the inventory management system according to this embodiment. However, in the following description based on FIG. 6, an information management device 2 also functions as an information processor 30.

Upon starting inventory management, the information management device 2 collects and records state quantities of the apparatuses 3, which include the driving conditions and states of designated components provided in the apparatuses 3 under inventory management, through the communication controllers and the like of the apparatuses 3 (step S101).

The information management device 2 determines whether or not the driving states of the designated components collected in step S101 are normal, in other words, whether the designated components have not failed (step S102). If normal, the information management device 2 calculates the cumulative failure rate of each designated component from the data on the driving states of the designated components collected in step S101, in consideration of an acceleration coefficient depending on the driving condition of each designated component, with reference to data on the cumulative failure rate of the designated components in a standard driving condition and data on an acceleration coefficient of the cumulative failure rate depending on a driving condition, and records a transition in the cumulative failure rate (step S103).

Furthermore, the information management device 2 checks a delivery time of each designated component stored in advance (step S104). Next, the information management device 2 calculates and records an estimated cumulative failure rate, which is a cumulative failure rate after a lapse of the delivery time from a certain point in time (a current point in time, in general), of each designated component, with reference to the delivery time of each designated component, the data on the cumulative failure rate of the designated component in the standard driving condition, the data on the acceleration coefficient of the cumulative failure rate depending on the driving condition, and the data on the transition of the cumulative failure rate recorded in step S103 (step S105).

Next, the information management device 2 calculates and records the sum of the estimated cumulative failure rates of the designated components having the same specifications, by adding up the estimated cumulative failure rates of the designated components having the same specifications calculated and recorded on a component by component basis in step S105 (step S106). The information management device 2 checks whether or not the designated components that have been arranged for in advance have been delivered (step S107). When the designated components have been delivered, the inventory quantity of delivered components is updated in a memory (step S108), and the operation proceeds to step S109. If NO in step S107, as a result of determination of the presence or absence of a delivery, the operation proceeds from step S107 directly to step S109.

In step S109, the information management device 2 determines whether or not "the inventory quantity of each type of the designated components"≥"the sum of estimated cumulative failure rates of each type of designated components having the same specifications"+Δn holds true, by comparing the inventory quantity of each type of the designated components stored in the memory and the sum of estimated cumulative failure rates of each type of the designated components having the same specifications calculated and recorded in step S106.

Δn is a margin represented by a positive integer including zero. Δn=0 is used in the examples of FIGS. 5a and 5b, and Δn=1 is used in the example of FIG. 5c, but the margin is not necessarily an integer. The determination equation is just an example, the margin may be provided based on an equation of "the inventory quantity of each type of the designated components"≥m×"the sum of estimated cumulative failure rates of each type of designated components having the same specifications", wherein m≥1. "Δn" and "m" may be changed depending on the type of designated components.

If YES in step S109, an appropriate inventory quantity is ensured. The information management device 2 determines whether or not a command to complete inventory management is issued (step S110). When the stop command is issued, inventory management is completed. When no stop command is issued, the information management device 2 returns to step S101, and continues inventory management.

Note that, in step S102, if any of the designated components is determined to be abnormal, as a result of determination on the driving states of the designated components, the information management device 2 notifies the outside of replacement of the abnormal component (step S111). An apparatus 3 having the abnormal component is recovered, and the inventory quantity of designated components is updated (step S112). If the replaced component is a new component, the information management device 2 resets the cumulative failure rate of the designated component to zero (step S113), and the operation returns to step S101 to continue inventory management.

If NO in step S109, there is an increased possibility that insufficient inventory may occur thereafter. Thus, the information management device 2 makes arrangements for a required inventory quantity of the designated components, which are determined to be NO in step S109, to satisfy the determination equation (step S114), and the operation returns to step S101 to continue inventory management.

By repetitions of steps S101 to S114, the inventory quantity of the designated components is managed in an appropriate manner.

As described above, the inventory management system 1 according to this embodiment has the function of calculating the sum of cumulative failure rates, i.e., the sum value of the cumulative failure rates of all the designated components having the same specifications used in the group of the apparatuses 3 at a certain point in time, in consideration of the acceleration coefficients depending on the driving conditions, relative to the standard cumulative failure rate of each type of the designated components having the same specifications used in the group of apparatuses 3 under the standard driving condition, and the function of calculating the appropriate inventory quantity of the designated components based on the calculated sum of the cumulative failure rates. These functions serve to make appropriate inventory management, in consideration of a failure showing no sign. Therefore, it is possible to prevent a delay in maintenance or recovery owing to insufficient inventory, as well as preventing an excessive inventory.

Note that, the information processor 30 such as the computer or the server disposed in the information management device 2 performs the above functions. More specifically, the information processor 30 performs a series of processes shown in FIG. 6, including, for example, the calculation of the cumulative failure rates and the sum of the cumulative failure rates, the determination, recording and the like. The information processor 30, which performs the above functions, may be connected to the information management device 2, or may be installed in any of the apparatuses 3 connected to the information management device 2.

In a case where, out of at least one type of the common designated components provided in the apparatuses 3 connected to the information management device 2, there is a component that has a gradually deteriorating characteristic (hereinafter referred to as a characteristic deteriorating component) and which needs to be replaced when the characteristic reaches a predetermined reference value, the time of replacement for the characteristic deteriorating component is preferably estimated from the characteristic of the characteristic deteriorating component at a certain point in time and a characteristic deterioration rate in consideration of an acceleration coefficient depending on a driving condition, relative to a standard characteristic deterioration rate of the characteristic deteriorating component under a standard driving condition. The inventory quantity of the designated components is preferably calculated in consideration of the time for replacement, in addition to the inventory quantity based on the sum of the cumulative failure rates. The information processor 30 also performs such functions.

Figure 7:
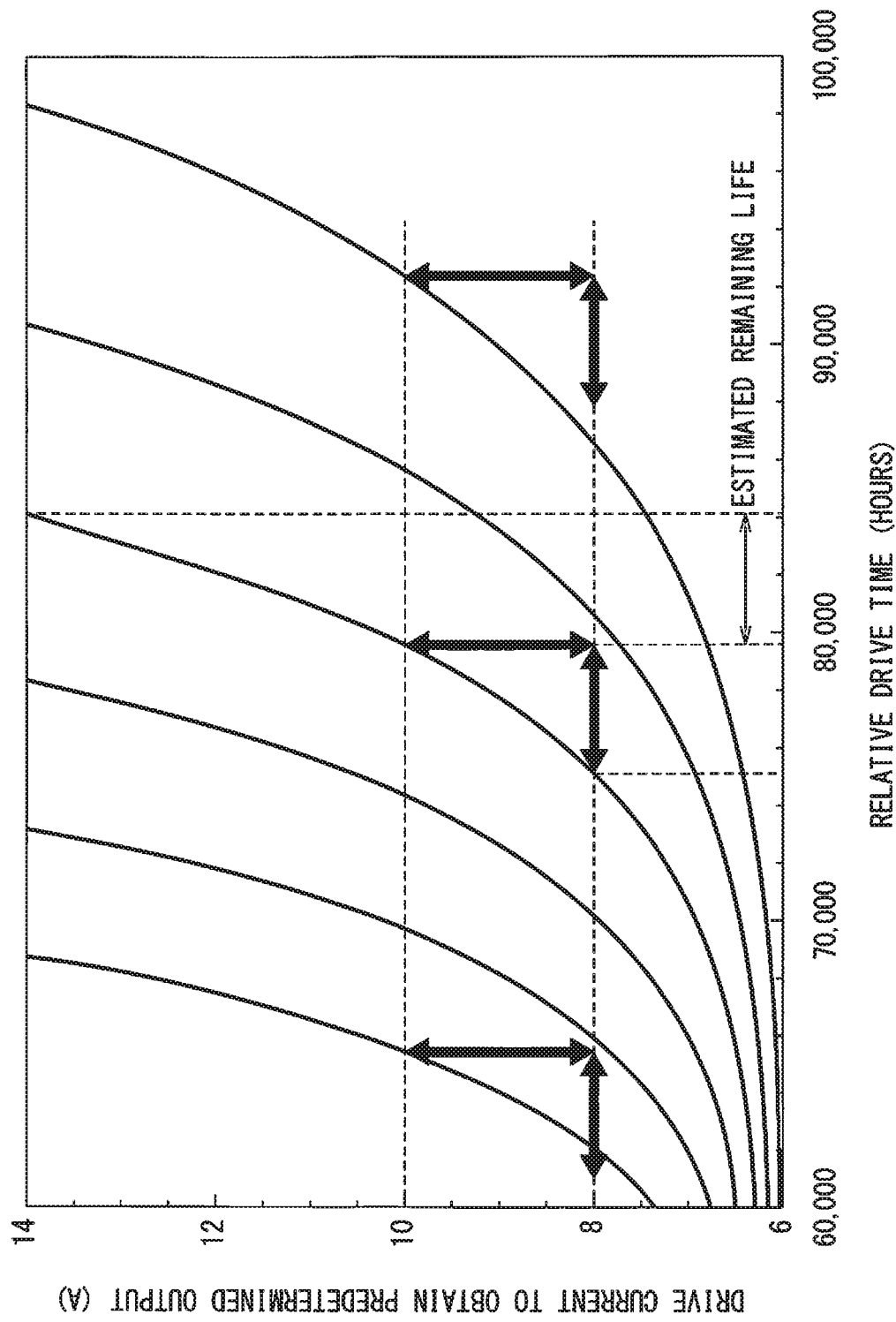
FIG. 7 is a graph showing characteristic change curves that indicate characteristic changes by driving, and a method for estimating remaining lifetime from a characteristic change curve in which a characteristic value and a deterioration rate coincide.

FIG. 7 shows an example of standard characteristic change curves that indicate time variations in the characteristics of characteristic deteriorating components the characteristics of which deteriorate by driving, under a standard driving condition. In the example of FIG. 7, a drive current that is required for driving the characteristic deteriorating component and obtaining an output of predetermined power is used as the characteristic. When the drive current to obtain the predetermined output exceeds 14A, the characteristic deteriorating component is determined to be at the end of its lifetime, and in need of replacement.

In an actual characteristic change, it is assumed that a drive current to obtain a predetermined output is 10A at a certain point in time, and a drive current to obtain the predetermined output is 8A before driving 4500 hours. When the actual characteristic change is compared with the standard characteristic change curves shown in FIG. 7, the leftmost standard characteristic change curve of the six standard characteristic change curves has a higher deterioration rate (i.e., a division of a characteristic change by a drive time) than the actual characteristic change. The rightmost standard characteristic change curve has a lower deterioration rate than the actual characteristic change. The fourth standard characteristic change curve from the left has almost the same deterioration rate as the actual characteristic change. Accordingly, remaining lifetime is estimated to be of the order of 4600 hours from the fourth standard characteristic change curve, which almost follows the actual characteristic change.

Figure 8:
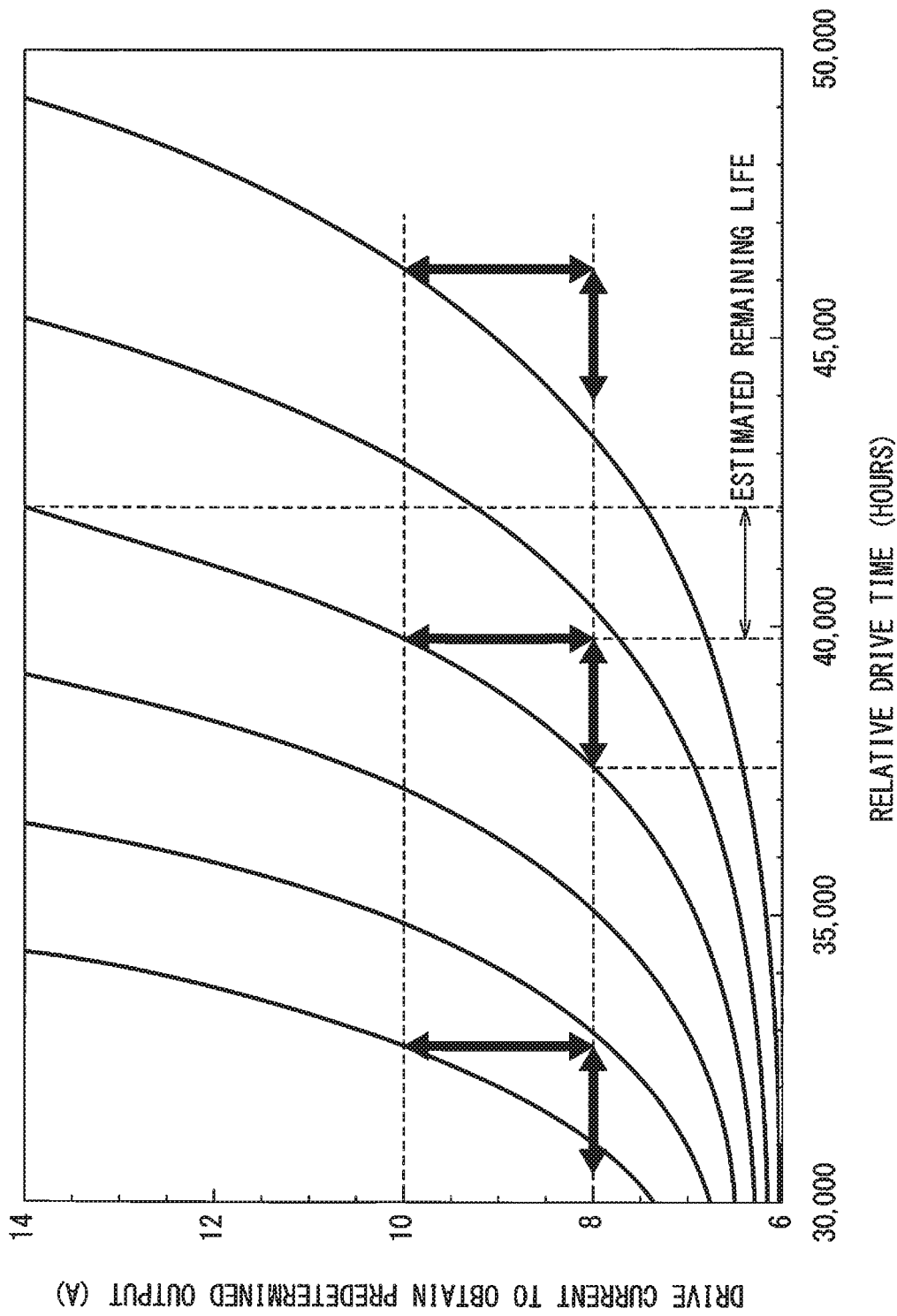
FIG. 8 is a graph showing characteristic change curves under a driving condition in which an acceleration coefficient of a deterioration rate by driving is twice as high as that of FIG. 7, and a method for estimating remaining lifetime from a characteristic change curve in which a characteristic value and a deterioration rate coincide.

When a driving condition having a twice acceleration of consuming a lifetime (i.e., a driving condition having an acceleration coefficient of 2) is used during an increase of the drive current from 8 A to 10 A to obtain the predetermined output at some point in time, it is necessary to estimate remaining lifetime by comparison with characteristic change curves shown in FIG. 8, in which the horizontal axis (time axis) of FIG. 7 is compressed into half. Since FIG. 8 uses a driving condition having twice accelerated lifetime consumption, the remaining lifetime is estimated to be of the order of 2300 hours, when the component is used under an unchanged driving condition. However, when the component is used under the standard driving condition (i.e., a driving condition having an acceleration coefficient of 1), the remaining lifetime is estimated to be of the order of 4600 hours. When the driving condition is changed during driving, it is necessary to use an average acceleration coefficient (=$\int$(acceleration coefficient)dt/$\int$dt), which is a division of a time integral value of a lifetime consumption acceleration coefficient at each point in time by a duration in time.

FIGS. 7 and 8 show a limited number of characteristic change curves, and a gradient curve between the characteristic change curves can be obtained by interpolation.

Note that, a lifetime consumption acceleration coefficient is referred to as "second acceleration coefficient", when distinction between the lifetime consumption acceleration coefficient and the other acceleration coefficients is needed.

As described above, when the at least one type of common designated components provided in the apparatuses 3 include the characteristic deteriorating component, the remaining lifetime can be estimated based on the characteristic change curve having the same characteristic deterioration rate as the characteristic change of the characteristic deteriorating component in a certain period (in a predetermined period before a certain point in time), out of the characteristic change curves in consideration of an acceleration coefficient depending on the driving condition of the characteristic deteriorating component, as shown in FIG. 8.

The characteristic deterioration rate of the characteristic deteriorating component in a certain period may be converted into a deterioration rate under the standard driving condition, and a remaining lifetime may be estimated based on the standard characteristic change curve having the same deterioration rate as the characteristic change in the certain period after the conversion, out of the standard characteristic change curves, as shown in FIG. 7. For example, in a driving condition having an acceleration coefficient of 2, the actual drive time corresponds to twice the drive time under the standard driving condition. Since a deterioration rate is a division of a characteristic change by the drive time (=characteristic change/drive time), a deterioration rate under the standard driving condition is half of an actual deterioration rate. Thus, a remaining lifetime can be estimated from one of the standard characteristic change curves, as shown in FIG. 7, having the same deterioration rate as a half deterioration rate of the actual characteristic change. However, when a driving condition is changed during driving, it is necessary to use a time integral value of a lifetime consumption acceleration coefficient at each point in time (=$\int$(acceleration coefficient)dt), as the drive time under the standard driving condition.

As described above, the deteriorating characteristic in the certain period is compared with the characteristic change curves in consideration of the acceleration coefficient depending on the driving condition, and the remaining lifetime and the time of replacement for the characteristic deteriorating component are estimated from the characteristic change curve having the same deterioration rate as the deteriorating characteristic. The inventory quantity of the designated components for maintenance is managed based on the estimated values, thus allowing for more appropriate performance of inventory management.

In the inventory management system according to this embodiment, the information management device 2 may make arrangements for a replacement component of the characteristic deteriorating component, in consideration of the time of replacement estimated from the degree of deterioration. Furthermore, the information management device 2 issues preventive maintenance information that recommends replacement of the characteristic deteriorating component, and serves to replace the component in a planned manner, before the deterioration characteristic reaches the predetermined reference value at which the characteristic deteriorating component needs to be replaced, in order to prevent a stoppage of the apparatus 3 having the component and an adverse effect on production using the apparatus 3.

Figure 9:
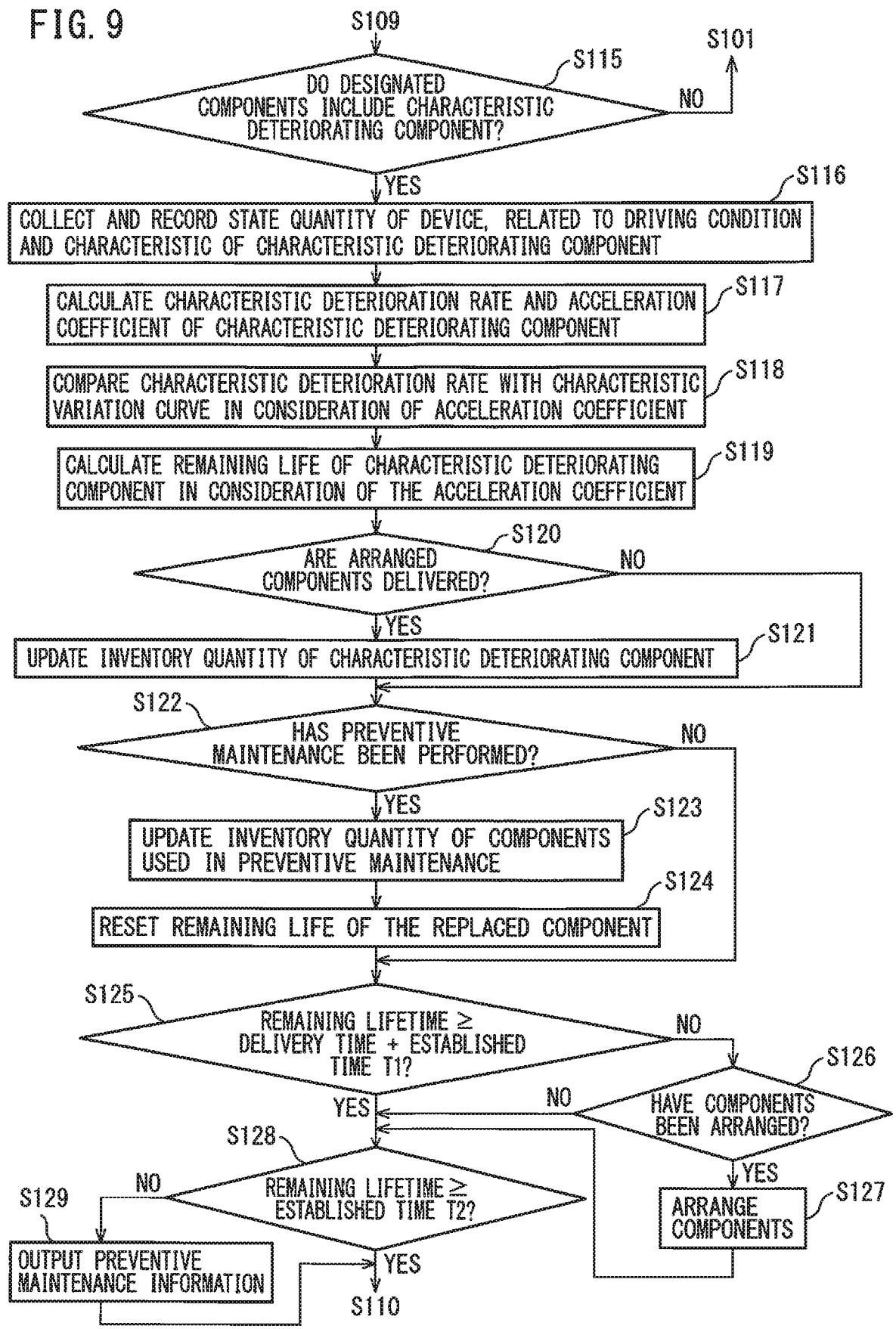
FIG. 9 is a flowchart showing an example of the operation of the inventory management system shown in FIG. 1, which is a flowchart that can be added to FIG. 6.

FIG. 9 is an example of a flowchart that can be added to FIG. 6, and shows steps of inventory management and preventive maintenance for the characteristic deteriorating component, as an additional operation flow. By inserting steps S115 to S129 of FIG. 9 between the steps S109 and S110 of FIG. 6, inventory management and preventive maintenance can be appropriately performed on the characteristic deteriorating component. In the following description based on FIG. 9, the information management device 2 also functions as the information processor 30.

In FIG. 9, after step S109 of FIG. 6, whether or not the designated components include a characteristic deteriorating component is determined (step S115).

When the designated components are not determined to include a characteristic deteriorating component in step S115, the operation of the information management device 2 returns to step S101 of FIG. 6. However, when the designated components are determined to include a characteristic deteriorating component, the information management device 2 collects and records the state quantity of each apparatus 3, which includes the driving condition and characteristic of the characteristic deteriorating component, through the communication controller and the like of the apparatus 3 under inventory management (step S116). The information management device 2 calculates a deterioration rate of the characteristic of the characteristic deteriorating component and an acceleration coefficient of the deterioration rate depending on the driving condition (step S117).

Subsequently, the information management device 2 compares the characteristic of the characteristic deteriorating component in a certain period with characteristic change curves, in consideration of the acceleration coefficient, as shown in FIG. 8 (step S118). The information management device 2 selects a curve having the same characteristic deterioration rate as the characteristic of the characteristic deteriorating component in the certain period, and calculates the remaining lifetime of the characteristic deteriorating component from the selected curve, in consideration of the acceleration coefficient depending on the driving condition (step S119).

Furthermore, the information management device 2 determines whether or not the characteristic deteriorating components that have made arrangements for due to a short lifetime and the like have been delivered (step S120). When the characteristic deteriorating components have been delivered, the inventory quantity of the delivered components is updated (step S121), and the operation proceeds to step S122. When they have not yet been delivered, the operation proceeds directly to S122.

In step S122, the information management device 2 determines whether or not preventive maintenance of a soon-to-be-replaced characteristic deteriorating component has been performed in accordance with preventive maintenance information that recommends replacement of the characteristic deteriorating component a predetermined time before the time of replacement. As a result of the determination, when preventive maintenance has been performed, the information management device 2 updates the inventory quantity of the characteristic deteriorating component used in preventive maintenance (step S123). The information management device 2 resets the remaining lifetime of the replaced characteristic deteriorating component to the average lifetime or the like (step S124), and the operation processed to step S125. When the preventive maintenance has not been performed, the operation proceeds directly from step S122 to step S125.

In step S125, the information management device 2 determines whether or not the remaining lifetime calculated in step S119 is longer than the time that a predetermined time T1 is added to a delivery time of the characteristic deteriorating component. In this specification, the delivery time indicates a time period required from an order of the component to a delivery thereof.

As to the predetermined time T1, which is provided as a margin in a sense, it is generally conceivable to calculate a remaining lifetime of a characteristic deteriorating component on the assumption that, for example, the characteristic deteriorating component that is driven under a driving condition having an average acceleration coefficient=2 remains under the driving condition having the average acceleration coefficient=2 in the future. However, in actual fact, the characteristic deteriorating component may be driven under a driving condition having, for example, an average acceleration coefficient=4, after being driven under the driving condition having the average acceleration coefficient=2. In such an instance, the actual remaining lifetime is reduced to half of the expected remaining lifetime, and therefore the predetermined time T1 is required to be set in consideration of the instance. Note that, continuously monitoring the driving condition and determining the remaining lifetime relatively frequently based on data on the driving condition minimizes the difference between an expected remaining lifetime and the actual remaining lifetime.

When "remaining lifetime delivery time+predetermined time T1" is not determined to be satisfied in step S125, the information management device 2 determines whether or not arrangements for the characteristic deteriorating components have been made (step S126). When no arrangement has yet been made, the information management device 2 makes arrangements for the characteristic deteriorating components (step S127) and records that arrangements for the characteristic deteriorating components have been made, and the operation proceeds to step S128. However, when "remaining lifetime≥delivery time+predetermined time T1" is determined to be satisfied in step S125, or arrangements for the characteristic deteriorating components are determined to have been made in step S126, the operation proceeds directly to step S128.

Step S128 determines whether or not "remaining lifetime≥predetermined time T2" is satisfied. When the remaining lifetime is shorter than the predetermined time T2, the information management device 2 recommends replacement of the characteristic deteriorating component, and issues preventive maintenance information to recommend replacement of the characteristic deteriorating component (step S129).

As examples of the issued preventive maintenance information, warning text may be displayed on a monitor, or an approximate remaining lifetime may be displayed on a monitor. To ensure the notification, the preventive maintenance information may be accompanied by sound and light. A plurality of different predetermined times T2 may be set, and the notification may be switched from an advisory to a warning with a reduction in the remaining lifetime. When "remaining lifetime≥predetermined time T2" is determined to have been satisfied in step S128, step S110 of FIG. 6 is performed, without performing step S129.

As described above, by repetitions of a series of processes including steps S101 to S114 of FIG. 6 and steps S115 to S129 of FIG. 9, as to the designated components that fail showing no signs, the inventory quantity can be managed in an appropriate manner based on the sum of the cumulative failure rates in consideration of the acceleration coefficients depending on the driving conditions. As to the characteristic deteriorating components the characteristics of which gradually deteriorate, the inventory quantity can be managed in an appropriate manner based on the time of replacement estimated from the characteristic deterioration rates in consideration of the acceleration coefficients depending on the driving conditions, and preventive maintenance can be performed in an appropriate manner by recommending replacement, as the time of replacement approaches.

In this embodiment, the operation flow (FIG. 6) for inventory management of the components that fail showing no signs and the operation flow (FIG. 9) for inventory management and preventive maintenance of the characteristic deteriorating components are performed in time sequence, but the present invention is not limited to this order. For example, whether or not designated components include characteristic deteriorating components may be determined initially. As a result of the determination, when the designated components include no characteristic deteriorating components, the operation flow of FIG. 6 may be performed. When the designated components include characteristic deteriorating components, the operation flow of FIG. 9 may be performed. In other words, the operation flows shown in FIGS. 6 and 9 may be performed in parallel.

The information processor 30 such as the computer or the server, which is required to calculate the deterioration rate and the remaining lifetime, to collect and record the information for the calculation, to record calculation results, to make determination based on the calculation results, and the like as shown in FIG. 9, is installed in the information management device 2. However, the information processor 30 may be connected to the information management device 2, or may be installed in any of the apparatuses 3 connected to the information management device 2. The information processor 30 may be identical to the information processor 30 that is used for the calculation of the cumulative failure rates and the sum of the cumulative failure rates, the determination, the record and the like as shown in FIG. 6, or may be different.

Figure 10:
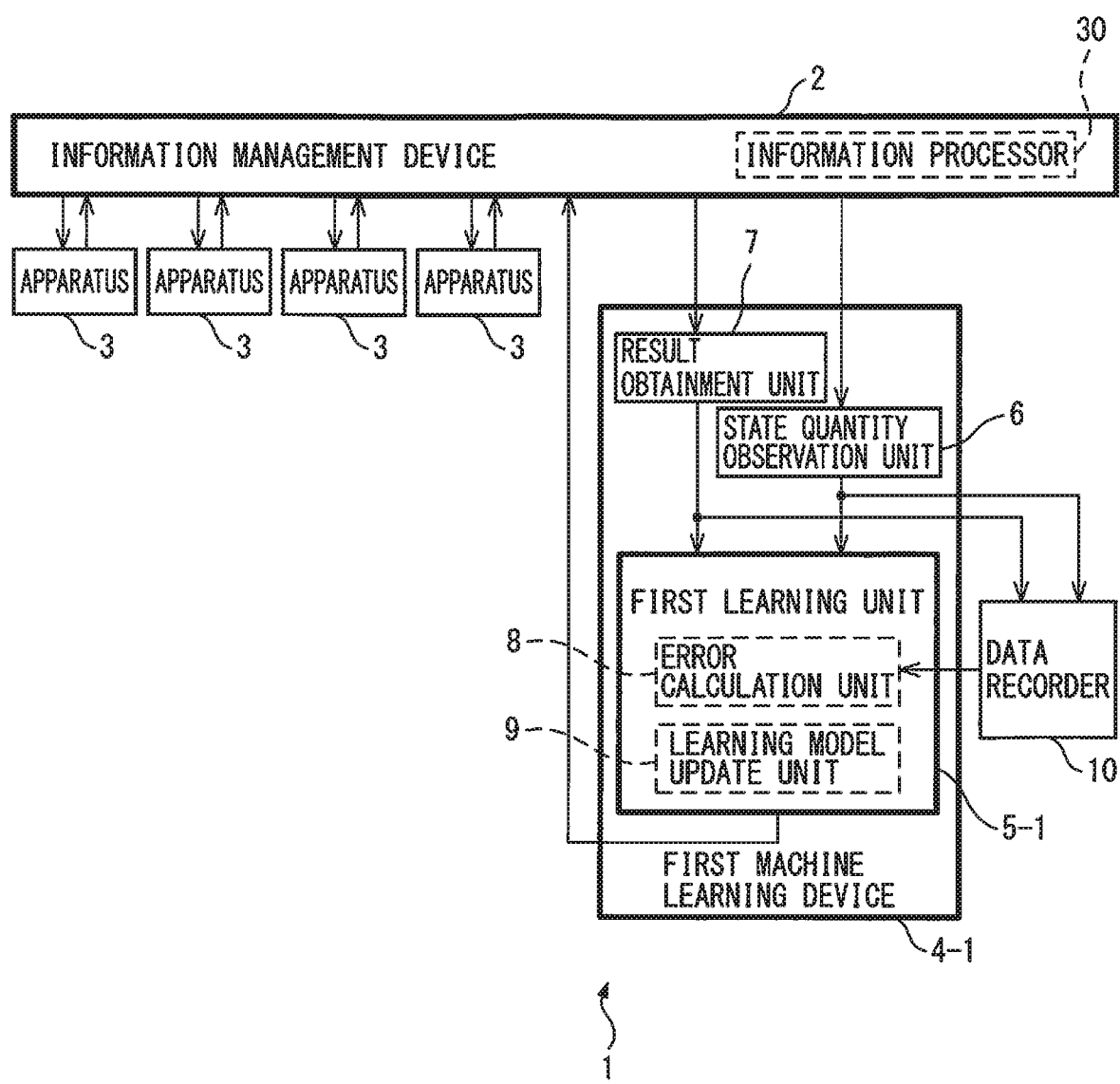
FIG. 10 is a block diagram showing the schematic configuration of an inventory management system according to another embodiment.

FIG. 10 is a block diagram showing the schematic configuration of an inventory management system 1 according to another embodiment. In the inventory management system 1 shown in FIG. 10, at least one first machine learning device 4-1 is connected to the above-described information management device 2.

The first machine learning device 4-1 includes a first learning unit 5-1, a state quantity observation unit 6 and a result obtainment unit 7. The first learning unit 5-1 includes an error calculation unit 8 and a learning model update unit 9. A data recorder 10 is provided outside the first machine learning device 4-1, to record data with results (labeled data) therein.

The state quantity observation unit 6 of the first machine learning device 4-1 observes outputs from components, such as communication controllers and memories, constituting apparatuses 3 connected to the information management device 2 and outputs from at least one of a variety of sensors provided in the apparatuses 3 and a variety of sensors provided around the apparatuses 3, as the state quantities of the apparatuses 3, including the driving conditions, states and the like of designated components.

The result obtainment unit 7 of the first machine learning device 4-1 obtains information about a failure occurring in the apparatuses 3.

The first learning unit 5-1 learns a standard cumulative failure rate curve (for example, see the solid lines of FIGS. 2a and 2b) that represents a time variation in the cumulative failure rate of each type of designated components under a standard driving condition, and a first acceleration coefficient (for example, see FIG. 3) that represents the acceleration ratio of the cumulative failure rate depending on a driving condition, with respect to the standard cumulative failure rate of each type of designated components under the standard driving condition, in association with the observed state quantities of the apparatuses 3 and the obtained failure information on the apparatuses 3.

An information processor 30 installed inside or outside the information management device 2 calculates the sum of cumulative failure rates with reference to the standard cumulative failure rate curve and the first acceleration coefficient of each type of designated components learned by the first learning unit 5-1, and operates in accordance with the operation flow shown in FIG. 6, to make appropriate inventory management in consideration of a failure showing no signs.

As concrete examples of the driving condition, state and the like of the designated component to be observed as the state quantity of the apparatus 3, there are drive current, application voltage, drive frequency, operation temperature, ambient temperature, temperature cycle, humidity, vibration and the like. Depending on the specifications of the component, the state quantity to be observed by the state quantity observation unit 6 may include light output, rotation speed, acceleration, audible sound, atmospheric gas composition, stress and the like.

The state quantity observation unit 6 may process data to make the data usable in the first learning unit 5-1 as necessary, in addition to observing the state quantities of the apparatuses 3.

There are various machine learning methods. Although a machine learning method to be applied to this embodiment is not specifically limited, in the example of FIG. 10, a data recorder 10 is provided outside the first machine learning device 4-1 to record labeled data to be used in supervised learning.

The first machine learning device 4-1 has a learning model to learn the standard cumulative failure rate curve and the first acceleration coefficient. To perform learning, the first machine learning device 4-1 calculates the error between information on the learning model and obtained actual failure information, i.e., a result (label), and updates the learning model in accordance with the error.

The data recorder 10 holds labeled data obtained until that point, and provides the labeled data for the error calculation unit 8. The labeled data may be provided for the error calculation unit 8 through a memory card, a communication line or the like.

Machine learning can be started from a state of having no labeled data by reinforcement learning. However, supervised learning using the labeled data obtained until that point has the advantage that learning can be performed in relatively short time.

According to this embodiment, even if the cumulative failure rate and the acceleration coefficient of the cumulative failure rate depending on the driving condition are unknown or imprecise, depending on the type of the designated components, it is possible to perform inventory management in an appropriate manner in consideration of a failure showing no signs. Since the first machine learning device 4-1 holds a series of learning processes, the cumulative failure rate and the acceleration coefficient of the cumulative failure rate depending on the driving condition have increased precision, and therefore inventory management can be performed more reliably.

Figure 11:
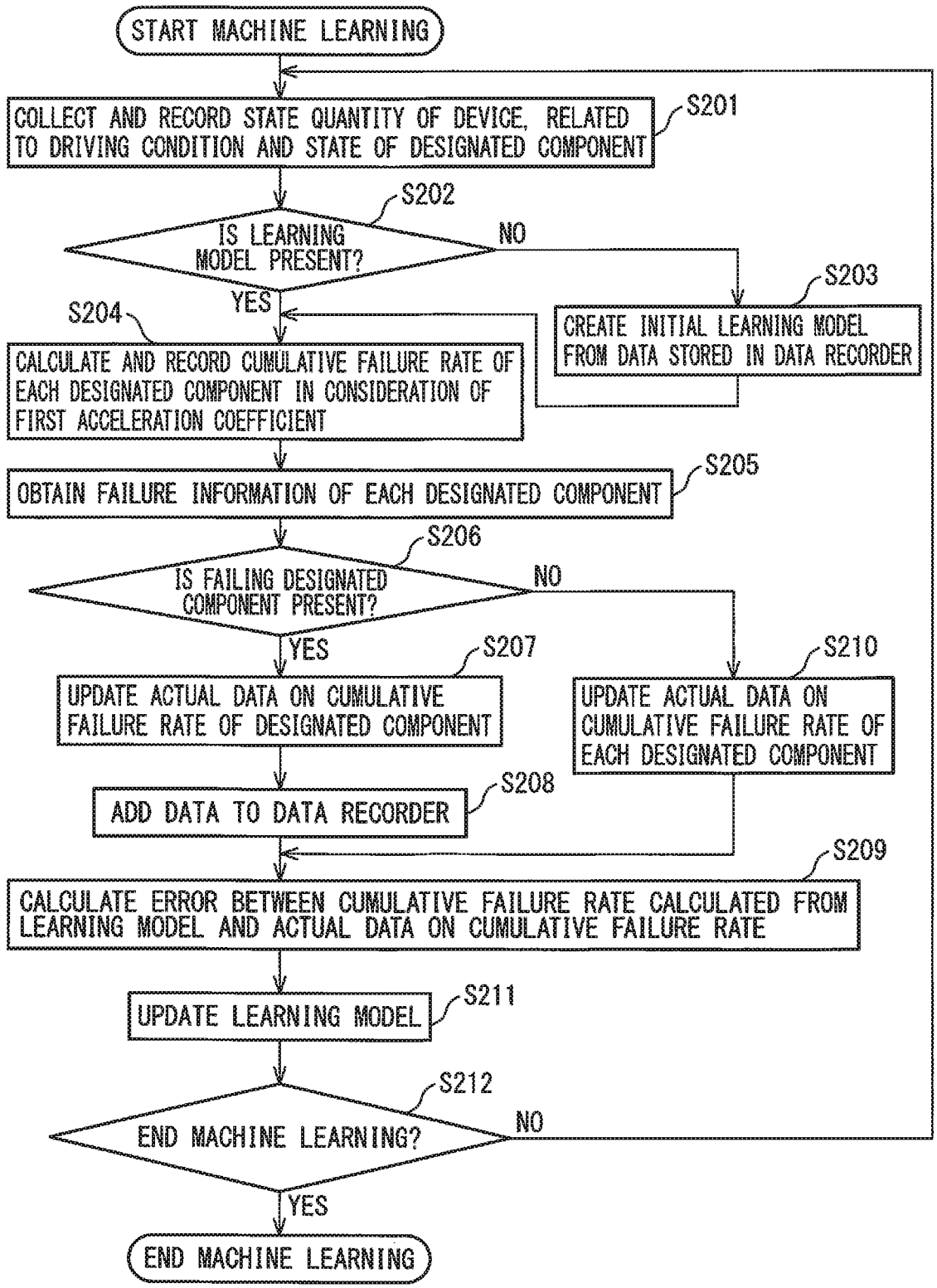
FIG. 11 is a flowchart showing an example of the operation of a machine learning device in the inventory management system shown in FIG. 10.

FIG. 11 is a flowchart showing an example of a machine learning operation according to this embodiment. However, in the following description based on FIG. 11, the information management device 2 also functions as the information processor 30.

Upon starting machine learning, the state quantity observation unit 6 of the first machine learning device 4-1 collects and records outputs from components, such as a communication controller and a memory, constituting each apparatus 3 and outputs from at least one of a variety of sensors provided in the apparatus 3 and a variety of sensors provided around the apparatus 3, as time variations in the state quantities of the apparatus 3, including the driving condition, state and the like of the designated component (step S201).

The first machine learning device 4-1 determines whether or not the first learning unit 5-1 has already had a learning model (step S202). When the first learning unit 5-1 has a learning model, the operation proceeds to step S204. When the first learning unit 5-1 has no learning model, the first machine learning device 4-1 creates an initial learning model from labeled data stored in the data recorder 10 (step S203), and the operation proceeds to step S204.

In step S204, the information management device 2 calculates and records a cumulative failure rate of each designated component in consideration of a first acceleration coefficient, with reference to the learning model provided in the first learning unit 5-1. The first machine learning device 4-1 obtains failure information of each designated component under inventory management through the information management device 2 (step S205).

The failure information is information about which one of the designated components has failed at what point in time. For example, the failure information can be obtained from the state quantity of the apparatus 3, which represents the state of the designated component. Alternatively, an operator may input information about replacement of a failing component to the information management device 2, at the time of replacing the failing component, and the input information may be used as the failure information.

The first machine learning device 4-1 determines, based on the obtained failure information, whether or not there is a failing designated component (step S206). When a failing designated component is determined to be present, actual data on the cumulative failure rate of the corresponding designated component is updated (step S207), and the updated actual data is added to the data recorder 10 (step S208). The error calculation unit 8 of the first machine learning device 4-1 calculates the error between the cumulative failure rate calculated from the learning model and the actual data on the cumulative failure rate (step S209). The learning model update unit 9 of the first machine learning device 4-1 updates the learning model so as to reduce the error (step S211). When a failing designated component is determined to be absent in step S206, the designated component has an increased actual drive time until its failure, so the first machine learning device 4-1 updates the actual data on the cumulative failure rate of each designated component (step S210), and the operation proceeds to step S211.

Upon the completion of updating of the learning model in step S211, the first machine learning device 4-1 determines whether or not a machine learning end command is present (step S212). When a machine learning end command is present, machine learning is completed. When a machine learning end command is absent, the operation returns to step S201 to continue machine learning.

As described above, by repetitions of a series of processes from step S201 to step S212, the first learning unit 5-1 can learn the standard cumulative failure rate curve of each type of designated components having the same specifications, and the first acceleration coefficient of the cumulative failure rate depending on the driving condition, with high precision.

A machine learning device (hereinafter referred to as a second machine learning device 4-2) of another inventory management system having the same configuration as the inventory management system 1 shown in FIG. 10 may observe outputs from components, such as communication controllers and memories, constituting apparatuses 3 connected to an information management device 2 and outputs from at least one of a variety of sensors provided in the apparatuses 3 and a variety of sensors provided around the apparatuses 3, as the state quantities of the apparatuses 3, including the driving conditions, characteristics and the like of characteristic deteriorating components. The second machine learning device 4-2 (not shown) may learn a standard characteristic change curve of the characteristic deteriorating component (see FIG. 7) and a second acceleration coefficient that represents the acceleration ratio of the characteristic deterioration rate depending on a driving condition, with respect to the standard characteristic change curve, by machine learning, in association with the observed state quantities of the apparatuses 3 and characteristic change information on the characteristic deteriorating components obtained as a part of the state quantities.

As concrete examples of the driving condition, characteristic and the like of the characteristic deteriorating component to be observed as the state quantity of the apparatus 3, there are drive current, application voltage, drive frequency, operation temperature, ambient temperature, temperature cycle, humidity, vibration and the like. Depending on the type of component, the state quantity to be observed by the state quantity observation unit 6 may include a torque output characteristic, a light output characteristic, a heat generation characteristic, rotation speed, acceleration, audible sound, atmospheric gas composition, stress and the like.

As with the first machine learning device 4-1 described above, the second machine learning device 4-2 includes a second learning unit 5-2, a state quantity observation unit 6, a result obtainment unit 7, and a data recorder 10. The second learning unit 5-2 includes an error calculation unit 8 and a learning model update unit 9.

The information management device 2 can estimate the remaining lifetime of each characteristic deteriorating component by performing the operation flow shown in FIG. 9, with reference to the standard characteristic change curve and the second acceleration coefficient of each type of the characteristic deteriorating components learned by the second learning unit 5-2 of the second machine learning device 4-2. Furthermore, even if the standard characteristic change curve and the second acceleration coefficient of the characteristic deteriorating components are unknown or imprecise, the information management device 2 can perform inventory management and preventive maintenance in an appropriate manner, using a series of learning processes held by the second machine learning device 4-2.

Figure 12:
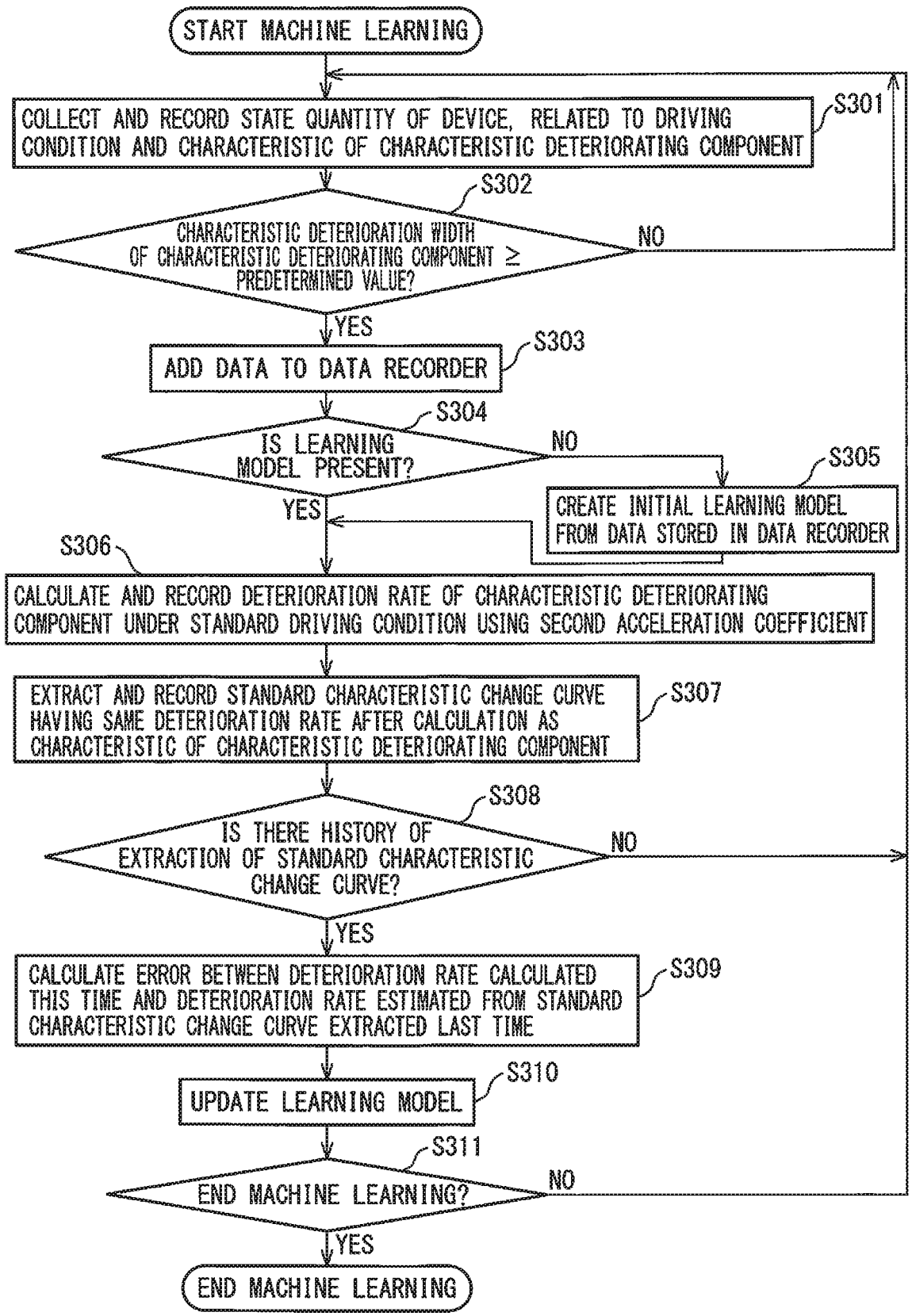
FIG. 12 is a flowchart showing another example of the operation of the machine learning device in the inventory management system.

FIG. 12 is a flowchart showing an example of a process for learning a standard characteristic change curve and a second acceleration coefficient of a characteristic deteriorating component. However, in the following description based on FIG. 12, the information management device 2 also functions as the information processor 30.

The second machine learning device 4-2 has a learning model to learn a standard cumulative failure rate curve and a second acceleration coefficient. To perform learning, the second machine learning device 4-2 calculates the error between the learning model and actual characteristic change information obtained by the result obtainment unit 7 of the second machine learning device 4-2, and updates the learning model in accordance with the error.

In the example of FIG. 12, upon starting machine learning, the second machine learning device 4-2 observes and records outputs from components, such as a communication controller and a memory, constituting each apparatus 3 and outputs from at least one of a variety of sensors provided in each apparatus 3 and a variety of sensors provided around the apparatus 3 through the state quantity observation unit 6, as a time variation in the state quantity of the apparatus 3, including the driving condition, characteristic and the like of a characteristic deteriorating component (step S301).

The second machine learning device 4-2 determines whether or not a characteristic deterioration width of the characteristic deteriorating component, i.e. a characteristic change from a predetermined time before a certain point in time, which is characteristic change information on the characteristic deteriorating component, is larger than a predetermined value (step S302). This is because if the characteristic deterioration width is not sufficiently larger than a measurement error, the deterioration rate, which is calculated as a division of the characteristic deterioration width by drive time, has an increased error, thus degrading precision in learning. When the characteristic deterioration width of the characteristic deteriorating component is smaller than the predetermined value, step S301 is performed again.

When the characteristic deterioration width of the characteristic deteriorating component is determined to be larger than the predetermined value, the second machine learning device 4-2 adds data with a result (characteristic deterioration width) (more specifically, the state quantity of the apparatus 3, including the driving condition, characteristic and the like of the characteristic deteriorating component) to the data recorder 10 (step S303).

Next, the second machine learning device 4-2 determines whether or not the second learning unit 5-2 has already had a learning model (step S304). When the second learning unit 5-2 has a learning model, the operation proceeds to step S306. When the second learning unit 5-2 has no learning model, the second machine learning device 4-2 creates an initial learning model from labeled data stored in the data recorder 10 (step S305), and the operation proceeds to step S306.

In step S306, the information management device 2 calculates and records a deterioration rate of the characteristic deteriorating component under a standard driving condition using a second acceleration coefficient, with reference to the learning model provided in the second learning unit 5-2. Furthermore, the information management device 2 extracts and records a standard characteristic change curve having the same deterioration rate after the calculation as the characteristic of the characteristic deteriorating component, with reference to the learning model (step S307), and determines whether or not there is a history of extraction of a standard characteristic change curve (step S308). When there is a history of extraction, the error calculation unit 8 calculates the error between the deterioration rate calculated in step S306 and a deterioration rate estimated from the standard characteristic change curve extracted last time (step S309), and updates the learning model so as to reduce the error (step S310). On the other hand, when it is determined that there is no history of extraction in step S308, the operation returns to step S301 and machine learning is continued.

Upon the completion of updating of the learning model in step S310, the second machine learning device 4-2 determines whether or not a machine learning end command is present (step S311). When a machine learning end command is present, machine learning is completed. When a machine learning end command is absent, the operation returns to step S301 to continue machine learning.

As described above, by repetitions of a series of processes between steps S301 and S311, the second learning unit 5-2 can learn the standard characteristic change curve of each type of characteristic deteriorating components having the same specifications, and the second acceleration coefficient related to lifetime consumption depending on the driving condition, with high precision. Furthermore, the information management device 2 can perform inventory management and preventive maintenance in a more appropriate manner by calculating the time of replacement of the characteristic deteriorating component, with reference to the characteristic change curve and the second acceleration coefficient learned by the second learning unit 5-2 of the second machine learning device 4-2.

Note that, this machine learning method is not limited to a supervised learning shown in FIG. 12 as an example.

Figure 13:
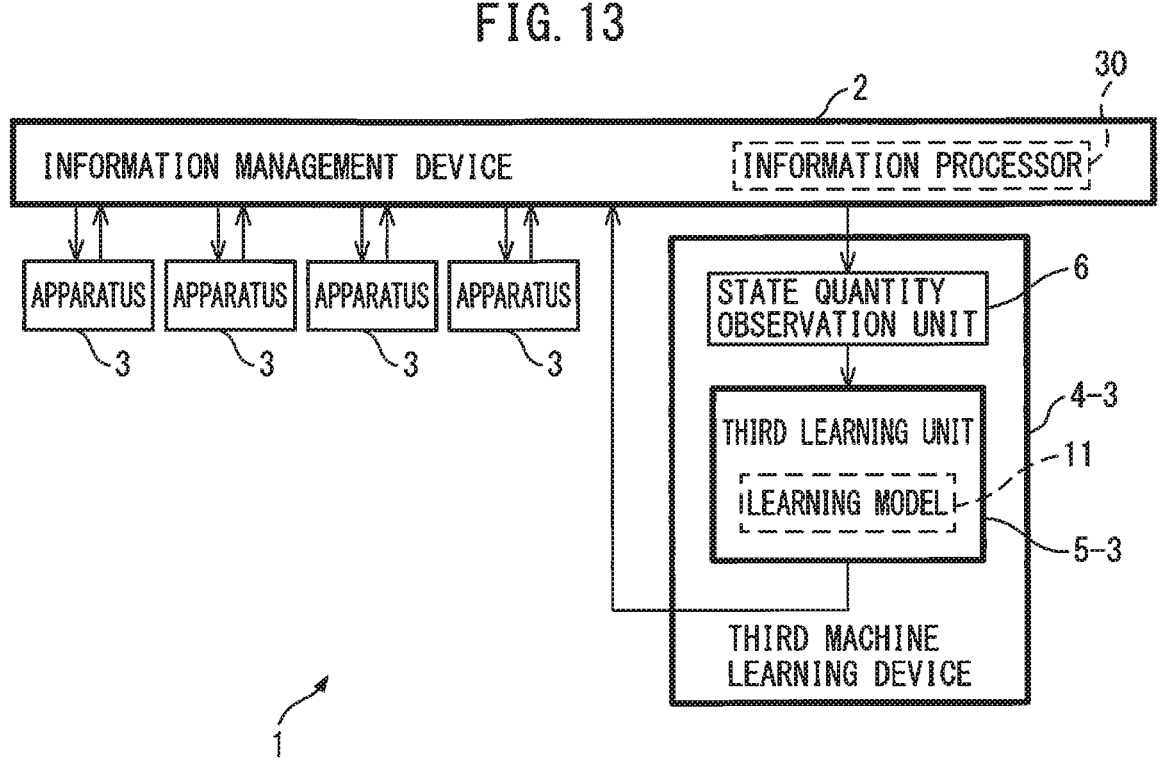
FIG. 13 is a block diagram showing the schematic configuration of an inventory management system according to yet another embodiment.
Figure 14:
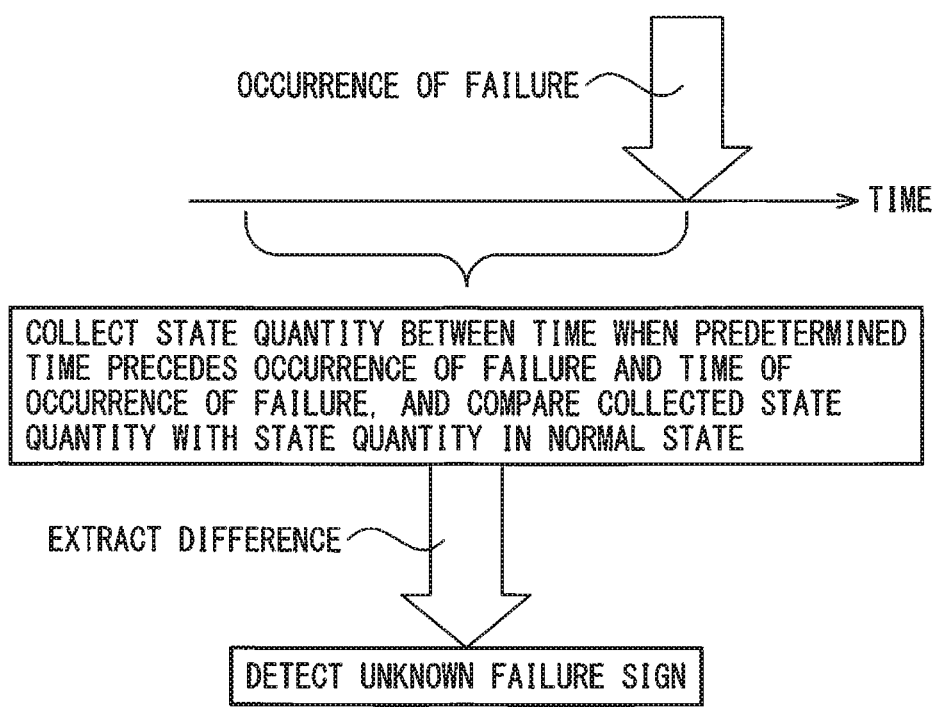
FIG. 14 is a drawing that schematically shows the flow of time until finding out an unknown sign.

Furthermore, an inventory management system 1 shown in FIG. 13 according to another embodiment can search for a failure sign of a designated component the failure sign of which is unknown. As shown in FIG. 13, a third machine learning device 4-3 is connected to an information management device 2. The third machine learning device 4-3 includes a third learning unit 5-3 and a state quantity observation unit 6. The third learning unit 5-3 has a learning model 11. FIG. 14 is a drawing that schematically shows the flow of time until finding out an unknown sign.

The third machine learning device 4-3 shown in FIG. 13 observes outputs from components, such as a communication controller and a memory, constituting each apparatus 3 having a designated component and outputs from at least one of a variety of sensors provided in the apparatus 3 and a variety of sensors provided around the apparatus 3 through the state quantity observation unit 6, as the state quantity of the apparatus 3, including the characteristic, state and the like of the designated component. Whenever a result indicating the occurrence of a failure in the designated component is received, except for a characteristic deteriorating component, provided in the apparatus 3, the third learning unit 5-3 of the third machine learning device 4-3 collects state quantity data of each type of failing components having the same specifications, between the time when a predetermined time precedes the occurrence of the failure and the time of the occurrence of the failure, out of the state quantities of the apparatuses 3 including the characteristics, states and the like of the failing components. The third learning unit 5-3 extracts a feature that is different from the state quantities of non-failing components, out of the collected state quantity data, to search for a failure sign.

Although the learning method is not specifically limited, unsupervised learning is suited for searching for an unknown failure sign from a large amount of data. As shown in FIG. 13, unsupervised learning does not need to obtain results (i.e., failure information). A large number of state quantities of the apparatuses 3 related to the driving conditions, including the states and characteristics of the designated components, are inputted, and the third learning unit 5-3 of the third machine learning device 4-3 establishes a learning model related to the distribution of the input data. The third learning unit 5-3 makes a comparison between the established learning model and the collected state quantity data (input data), to detect a variation in the state quantity (a failure sign).

The unsupervised learning learns the distribution of the input data, and extracts an essential configuration behind the data, without requiring corresponding output data (training data), and thus may find out an unknown failure sign.

The state quantity of the apparatus 3 and the variation thereof, including the characteristic, state and the like of the failing component, observed by the state quantity observation unit 6 of the third machine learning device 4-3 varies depending on the type of the components. As concrete examples of the state quantity of the apparatus 3, there are an electrical input and output characteristic (e.g., change in resistance and the like), a light output characteristic (e.g., reduction in electric-optic conversion efficiency and the like), a heat generation characteristic (e.g., increase in calorific power and the like), a torque output characteristic (e.g., reduction in torque and the like), an acoustic output characteristic (e.g., reduction in acoustic output and the like), temperature (e.g., increase in temperature and the like), vibration (e.g., increase in vibration and the like), displacement (e.g., occurrence of displacement and the like) and the like.

Figure 15:
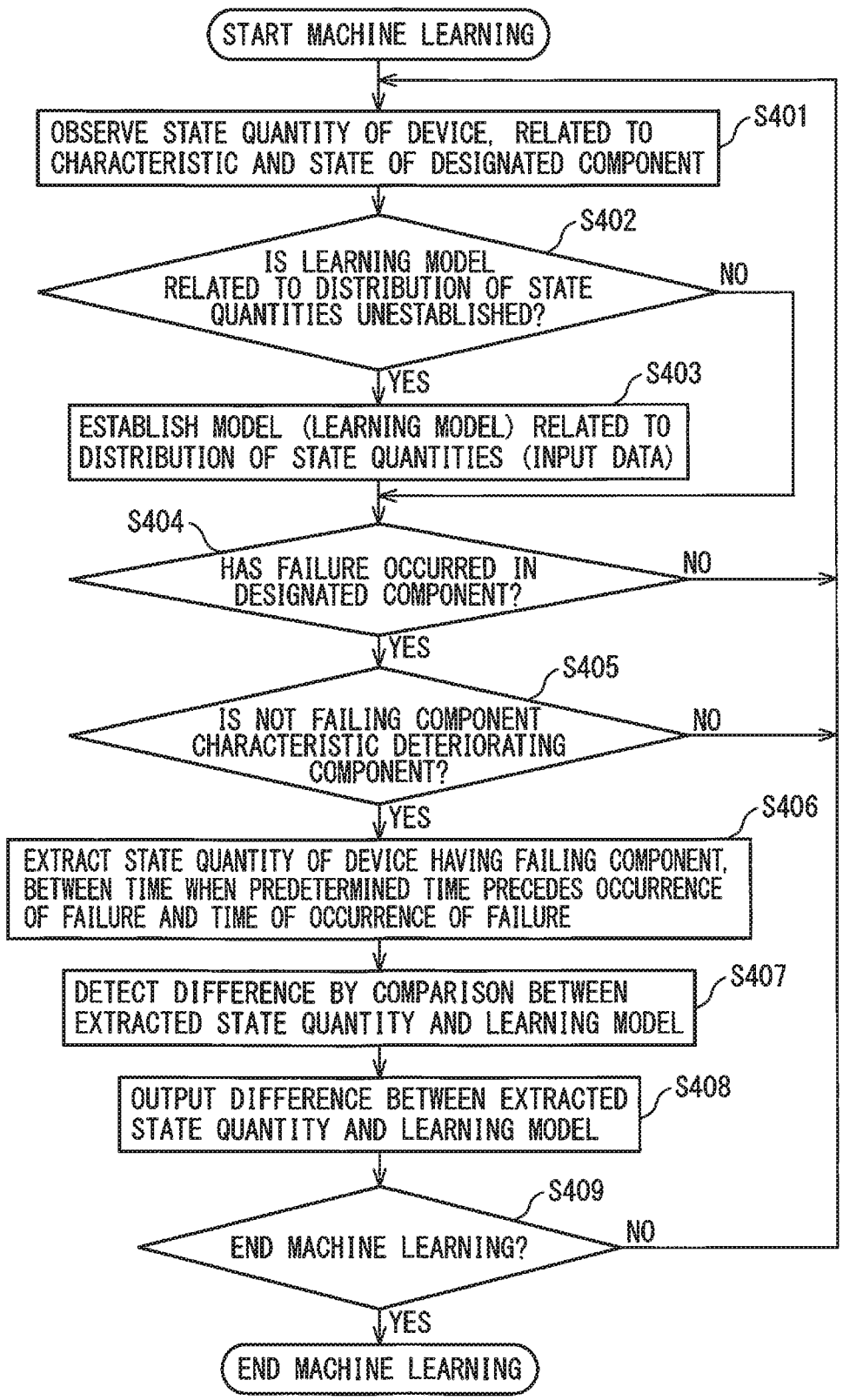
FIG. 15 is a flowchart showing an example of the operation of a machine learning device in the inventory management system shown in FIG. 13.

FIG. 15 is a flowchart showing an example of a process in which the third machine learning device 4-3 extracts a feature that is different from the state quantities of non-failing components, out of collected state quantity data before the occurrence of a failure, to detect a failure sign. However, in the following description based on FIG. 15, the information management device 2 also functions as an information processor 30.

The third machine learning device 4-3 learns the distribution of state quantity data and a model related to the regularity of the data. The third machine learning device 4-3 detects a change in the state quantity data before the occurrence of a failure, in other words, a sign before the occurrence of a failure, and outputs a learning result to the information management device 2.

In the example of FIG. 15, upon starting machine learning, the state quantity observation unit 6 of the third machine learning device 4-3 observes outputs from components, such as a communication controller and a memory, constituting each apparatus 3 and outputs from at least one of a variety of sensors provided in the apparatus 3 and a variety of sensors provided around the apparatus 3, as the state quantity of the apparatus 3, including the characteristic, state and the like of a designated component (step S401).

Next, in step S402, when a learning model related to the distribution of state quantities is determined to be unestablished, the third learning unit 5-3 of the third machine learning device 4-3 establishes or updates a model (learning model) related to the distribution of the state quantities (input data) and the regularity of the data (step S403). In step S402, when a learning model is determined to have been established by batch learning, sufficient online learning, or the like, the operation proceeds to step S404 without performing step S403.

Subsequently, when a failure is determined to have occurred from the state quantity and the like observed by the state quantity observation unit 6 (step S404), the third machine learning device 4-3 determines whether or not a failing component is a characteristic deteriorating component the failure sign of which is not required to be searched for (step S405). When the failing component is not a characteristic deteriorating component, the third machine learning device 4-3 extracts state quantity data of the apparatus 3 having the failing component, between the time when a predetermined time precedes the occurrence of the failure and the time of the occurrence of the failure (step S406). The third machine learning device 4-3 detects the difference by comparison between the extracted state quantity and the learning model (step S407), and outputs the difference to the information management device 2 or another output device (not shown), as a failure sign of the failing component (step S408).

After that, the third machine learning device 4-3 determines whether or not a machine learning end command is present (step S409). When a machine learning end command is present, machine learning is completed. When a machine learning end command is absent, the operation returns to step S401 to continue machine learning.

When no failure is determined to have occurred in the designated component in step S404, or the failing component is determined to be a characteristic deteriorating component in step S405, the operation returns to step S401 to continue machine learning.

As described above, by repetitions of a series of processes between steps S401 and S409, the third learning unit 5-3 can output data that surely or probably indicates the failure sign of the designated components the failure sign of which is unknown or uncertain, to the information management device 2 in a repeated manner.

The third machine learning device 4-3 according to this embodiment additionally has, for example, the following functions, as well as outputs data surely or probably indicating the failure sign of the designated components.

The third learning unit 5-3 of the third machine learning device 4-3 extracts a feature that is different from state quantities of non-failing components, out of collected state quantity data before the occurrence of a failure. When the different feature is determined to be a failure sign of a designated component, the third learning unit 5-3 learns a failure occurrence probability distribution relative to time after the appearance of the failure sign, and the dependence of the failure occurrence probability distribution relative to time on a driving condition, in association with the state of the failure sign including an occurrence area and an occurrence frequency of the failure sign, the state quantity data of the apparatus related to the driving condition of the failing component between the appearance of the failure sign and the occurrence of the failure, and an actual time of the occurrence of the failure observed by the state quantity observation unit 6 The third learning unit 5-3 issues preventive maintenance information to recommend replacement of the designated component showing the failure sign (hereinafter referred to as a component showing the sign), and issues failure occurrence prediction information on the component showing the sign, with reference to the learning result, until the designated component showing the sign actually fails. The third machine learning device 4-3 having the above functions is similar to the first machine learning device 4-1 shown in FIG. 10. The information management device 2 can manage the inventory quantity for the designated components for maintenance, in consideration of the failure occurrence prediction information, in addition to the failure rates and the times of replacement of the components.

Figure 16:
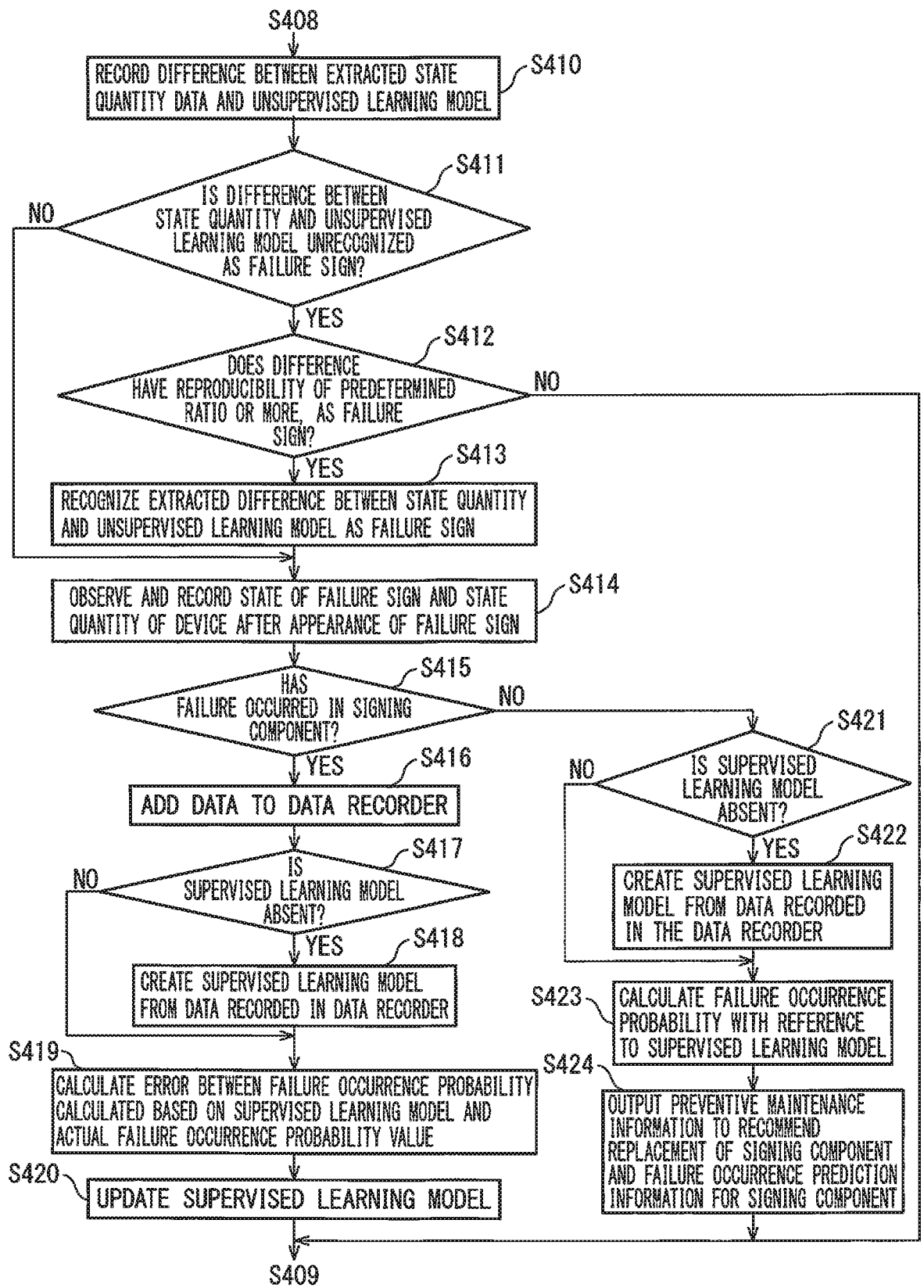
FIG. 16 is a flowchart showing an example of the operation of the inventory management system shown in FIG. 13, which is a flowchart that can be added to FIG. 15.

FIG. 16 is an example of a flowchart that can be added to FIG. 15, and shows an additional operation flow in which, as described above, when a failure sign is seen, the third machine learning device 4-3 learns a failure occurrence probability distribution relative to the time after the appearance of the failure sign, and the dependence of the failure occurrence probability distribution relative to the time on a driving condition, in association with the state of the failure sign, the state quantity of the apparatus related to the driving condition of the failing component between the appearance of the failure sign and the occurrence of the failure, and an actual time of the occurrence of the failure. The third machine learning device 4-3 recommends replacement of the component showing the sign with reference to the learning result, until the component showing the sign actual fails, and the learning result is reflected on inventory management of the components showing the sign. In the following description based on FIG. 16, the information management device 2 also functions as an information processor 30.

By inserting a series of processes from step S410 to step S424 of FIG. 16 between step S408 and step S409 of FIG. 15, inventory management and preventive maintenance can be appropriately performed on a component showing the sign. When the operation flow shown in FIG. 16 is performed, the third machine learning device 4-3 has the same components as the first machine learning device shown in FIG. 10.

In FIG. 16, after step S408 of FIG. 15, the third machine learning device 4-3 records the difference between the state quantity data of the designated component from the time when the predetermined time precedes the occurrence of the failure, and the model (hereinafter referred to as unsupervised learning model) related to the distribution and regularity of state quantities that is established by unsupervised learning from state quantity data of not-failing designated components having the same specifications as the failing designated component (step S410). The third machine learning device 4-3 determines whether or not the difference is recognized as a failure sign of the failing designated component (step S411). When the difference is not recognized as a failure sign, the third machine learning device 4-3 determines whether or not the difference has a reproducibility of a predetermined ratio or more, as a failure sign of the designated component, with reference to information on the difference recorded in step S410 (step S412). When the difference has a reproducibility of the predetermined ratio or more, the third machine learning device 4-3 recognizes the extracted difference between the state quantity and the unsupervised learning model as a failure sign (step S413), and observes and records the state of the failure sign including an occurrence area and an occurrence frequency of the failure sign, and the state quantity of the apparatus 3 related to the driving condition of the failing designated component after the appearance of the failure sign (step S414).

When the difference does not have a reproducibility of the predetermined ratio or more and is not recognized as a failure sign in step S412, the operation proceeds to step S409 of FIG. 15. When the difference is determined to be recognized as a failure sign of the failing component in step S411, the operation proceeds to step S414 of FIG. 16.

Next, the third machine learning device 4-3 determines whether or not a failure has actually occurred in the component showing the sign (step S415). When a failure has occurred, the third machine learning device 4-3 adds the state of the failure sign and the state quantity of the apparatus 3, which have a drive time between the appearance of the failure sign and the actual failure as a result (label), as labeled data (step S416).

Furthermore, the third learning unit 5-3 of the third machine learning device 4-3 learns a failure occurrence probability distribution relative to time after the appearance of the failure sign, and the dependence of the failure occurrence probability distribution relative to time on a driving condition by supervised learning, in association with the state of the failure sign, the state quantity data of the apparatus related to the driving condition of the failing component between the appearance of the failure sign and the occurrence of the failure, and the drive time between the appearance of the failure sign and the occurrence of the failure, and determines whether or not a supervised learning model has already been present (step S417). When a supervised learning model is absent, the third learning unit 5-3 creates an initial supervised learning model from data recorded in the data recorder 10 (step S418). When a supervised learning model is present in step S417, the operation proceeds to step S419 without performing step S418.

Subsequently, the third learning unit 5-3 calculates the error between a failure occurrence probability calculated by an error function provided in the supervised learning model and an actual failure occurrence probability value (step S419). The third learning unit 5-3 updates the supervised learning model so as to reduce the error (step S420), and the operation proceeds to step S409 of FIG. 15.

When the designated component showing the failure sign is not determined to have failed in step S415, the third learning unit 5-3 determines whether or not a supervised learning model is present (step S421). When a supervised learning model is absent, the third learning unit 5-3 creates an initial supervised learning model from data recorded in the data recorder 10 (step S422), and calculates a time variation in the failure occurrence probability or a cumulative failure rate with reference to the supervised learning model (step S423). On the other hand, when a supervised learning model is determined to be present in step S421, the operation proceeds to step S423 without performing step S422.

After step S423, the third learning unit 5-3 outputs at least one of preventive maintenance information to recommend replacement of the component showing the sign and failure occurrence prediction information required for inventory management of the component showing the sign to the information management device 2, based on the calculated time variation in the failure occurrence probability or the cumulative failure rate (step S424), and the operation proceeds to step S409 of FIG. 15. The cumulative failure rate can be calculated by integrating the failure occurrence probability with respect to time.

As described above, by repetitions of steps S401 to S424, including steps S410 to S424 of FIG. 16 added to steps S401 to S409 of FIG. 15, it is possible to find out the failure sign of the designated components the failure sign of which has been unknown or is uncertain. Furthermore, when the state of the designated component before the failure is recognized as the failure sign by the additional operation flow shown in FIG. 16, learning is repeatedly performed in association with the state of the failure sign, the state quantity of the apparatus 3 related to the driving condition of the signing component, and the time variation in the failure occurrence probability. With reference to the learning results, for example, the cumulative failure rate and the acceleration coefficient of the designated component depending on the driving condition, as shown in FIG. 2b, can be calculated more precisely. Thus, preventive maintenance and inventory management can be performed more reliably.

Figure 17:
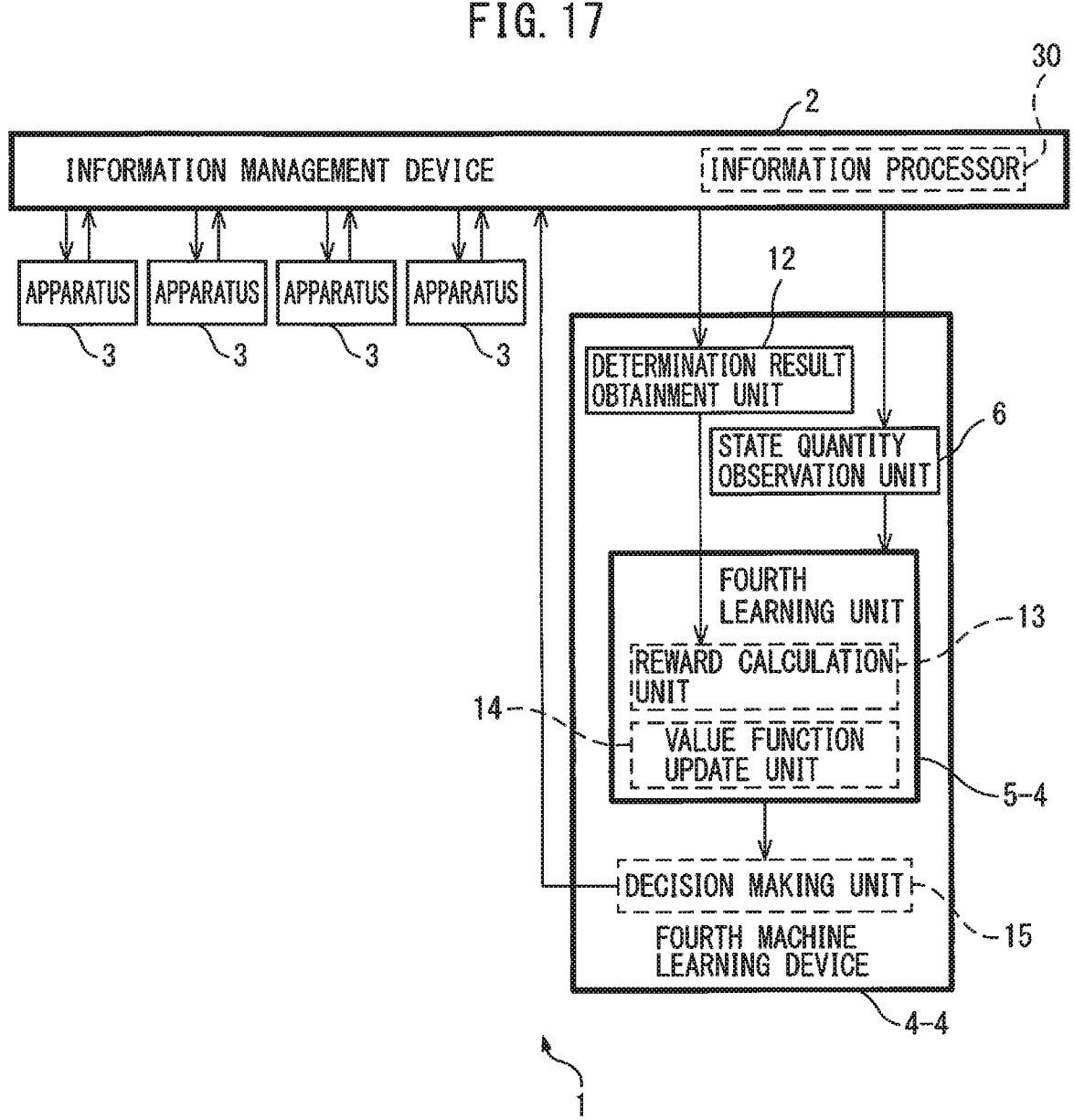
FIG. 17 is a block diagram showing the schematic configuration of an inventory management system according to yet another embodiment.

FIG. 17 is a block diagram showing the schematic configuration of an inventory management system 1 according to yet another embodiment. In this embodiment shown in the drawing, at least a fourth machine learning device 4-4 is connected to the information management device 2 described above.

The fourth machine learning device 4-4 includes a fourth learning unit 5-4, a state quantity observation unit 6, a determination result obtainment unit 12, and a decision making unit 15. The fourth learning unit 5-4 includes a reward calculation unit 13 and a value function update unit 14.

To be more specific, the state quantity observation unit 6 observes the state quantity of each apparatus 3 connected to the information management device 2. The determination result obtainment unit 12 obtains a determination result related to right and wrong of an estimation result as to a failing component, i.e., a failing portion of the apparatus 3. The estimation result as to the failing component is meant to estimate which component or which portion fails in the failing apparatus 3.

The fourth learning unit 5-4 receives an output from each of the state quantity observation unit 6 and the determination result obtainment unit 12, and learns the estimation result of the failing component in the apparatus 3, in association with the state quantity of the apparatus 3 and the determination result related to right and wrong of the estimation result as to the failing component.

The decision making unit 15 determines the estimation result of the failing component to be outputted from the fourth machine learning device 4-4, with reference to the learning result by the fourth learning unit 5-4.

Furthermore, the reward calculation unit 13 of the fourth learning unit 5-4 has a value function to determine the value of the estimation result of the failing component, and calculates a positive reward when the estimation result is right, while calculates a negative reward when the estimation result is wrong. The value function update unit 14 of the fourth learning unit 5-4 updates the value function in accordance with the reward calculated by the reward calculation unit 13.

The fourth machine learning device 4-4 having the above configuration diagnoses a failure of the apparatus 3, with reference to the learning result of the fourth learning unit 5-4.

Figure 18:
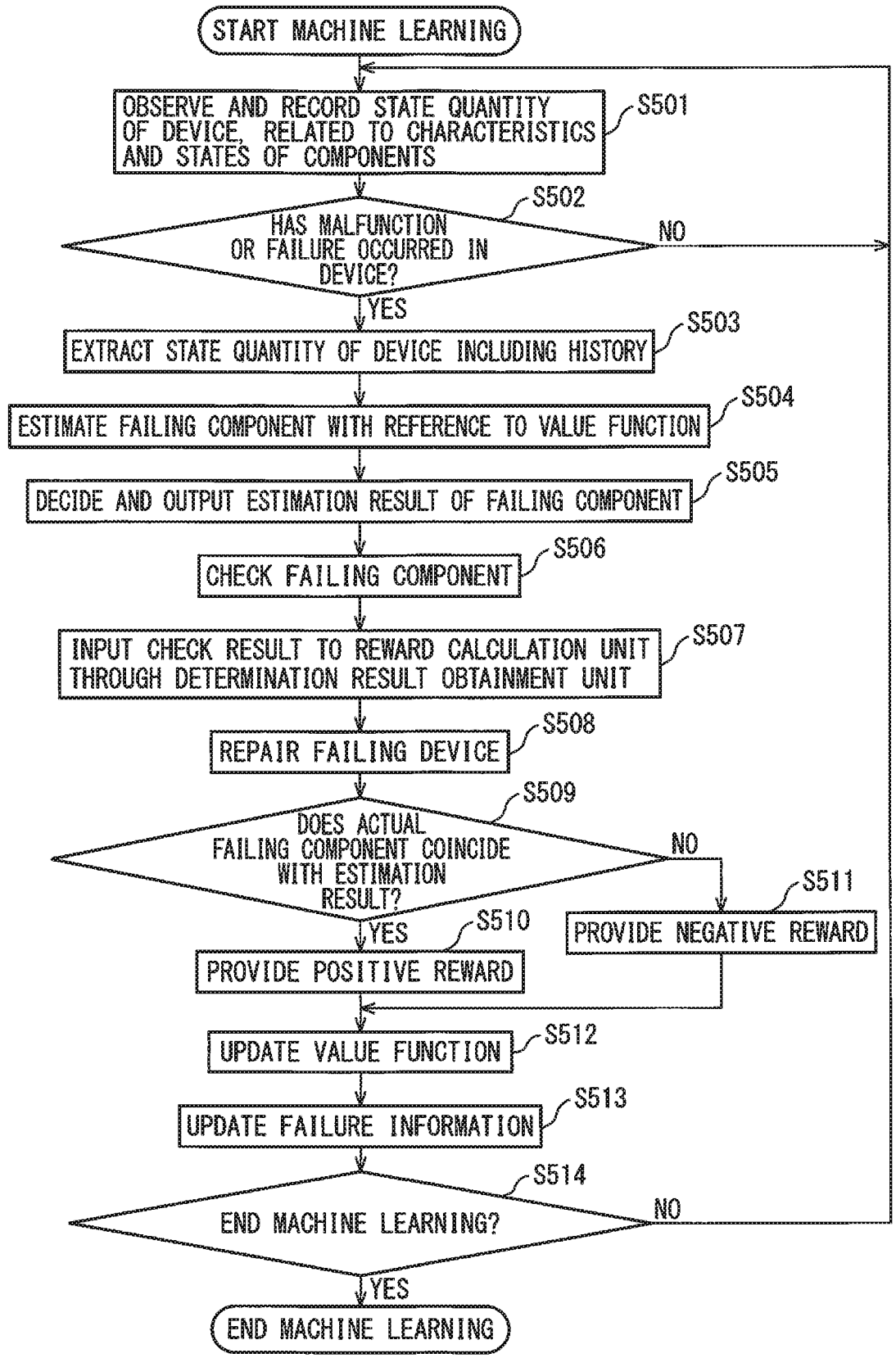
FIG. 18 is a flowchart showing an example of the operation of a machine learning device in the inventory management system shown in FIG. 17.

FIG. 18 is a flowchart showing an example of the operation of the inventory management system 1 shown in FIG. 17. In this embodiment shown in FIG. 18, the information management device 2 also functions as an information processor 30.

Upon starting machine learning, the state quantity observation unit 6 of the fourth machine learning device 4-4 observes the state quantity of the apparatus 3 connected to the information management device 2, including the characteristics, states and the like of components (step S501). The state quantity observation unit 6 processes the state quantity data as necessary, and outputs the state quantity data to the fourth learning unit 5-4.

The fourth learning unit 5-4 makes a comparison between the state quantity data and a state quantity in a normal operation recorded in advance, to determine whether or not a malfunction or failure has occurred in the apparatus 3 (step S502). When a malfunction or failure is determined to have occurred in the apparatus 3, the fourth learning unit 5-4 extracts the state quantity of the apparatus 3 including a history of the state quantity of the failing apparatus 3, such as failure information, characteristic change information and the like stored until the time of occurrence of the malfunction (step S503). The fourth learning unit 5-4 estimates a failing component from the extracted state quantity, with reference to a value function, which is a learning result of the fourth learning unit 5-4, for determining the value of a failing component estimation result (step S504). Based on the failing component estimation result, the decision making unit 15 determines the failing component estimation result to be outputted, with reference to the learning result by the fourth learning unit 5-4, and outputs the failing component estimation result to the information management device 2 (step S505).

Next, upon receiving information about the occurrence of a malfunction or failure in a certain apparatus 3, the information management device 2 checks the failing component of the apparatus 3 (step S506). The determination result obtainment unit 12 of the fourth machine learning device 4-4 obtains the check result as a determination result, and outputs the determination result to the reward calculation unit 13 (step S507). The failing component is replaced or the like, to repair the failing apparatus 3 (step S508).

Subsequently, the fourth learning unit 5-4 determines whether or not the actual failing component checked in step S506 coincides with the failing component estimation result outputted from the decision making unit 15 (step S509). When the actual failing component coincides with the failing component estimation result, the reward calculation unit 13 provides a positive reward (step S510). When the actual failing component does not coincide with the failing component estimation result, the reward calculation unit 13 provides a negative reward (step S511). The value function update unit 14 updates a value function for determining the value of the failing component estimation result, in accordance with the reward (step S512). Furthermore, the fourth machine learning device 4-4 adds failure information on the failing apparatus 3 to a failing information history for update (step S513).

After that, the fourth machine learning device 4-4 determines whether or not a machine learning end command is present (step S514). When a machine learning end command is present, machine learning is completed. When a machine learning end command is absent, the operation returns to step S501 to continue machine learning. When no malfunction or failure is determined to have occurred in the apparatus 3 in step S502, the operation returns to step S501, and the fourth machine learning device 4-4 continues machine learning.

As described above, by repetitions of a series of processes from step S501 to step S514, the fourth learning unit 5-4 can learn the failure component estimation result on the apparatus 3, in association with the state quantity of the apparatus 3 including the history of the state quantity of the apparatus 3, and the determination result corresponding to the failing component estimation result. Therefore, the fourth learning unit 5-4 can diagnose the failure in the apparatus 3.

The failure component estimation result to be outputted from the fourth machine learning device 4-4 may include not only a first candidate having the highest probability, but also a plurality of candidates that are listed in decreasing order of probability. In this case, the higher ranked the candidate the actual failing component coincides with, the larger positive reward the reward calculation unit 13 provides. When the actual failing component coincides with none of the listed candidates, the reward calculation unit 13 provides a negative reward. Based on the rewards provided under such conditions, the value function update unit 14 updates the value function.

Figure 19:
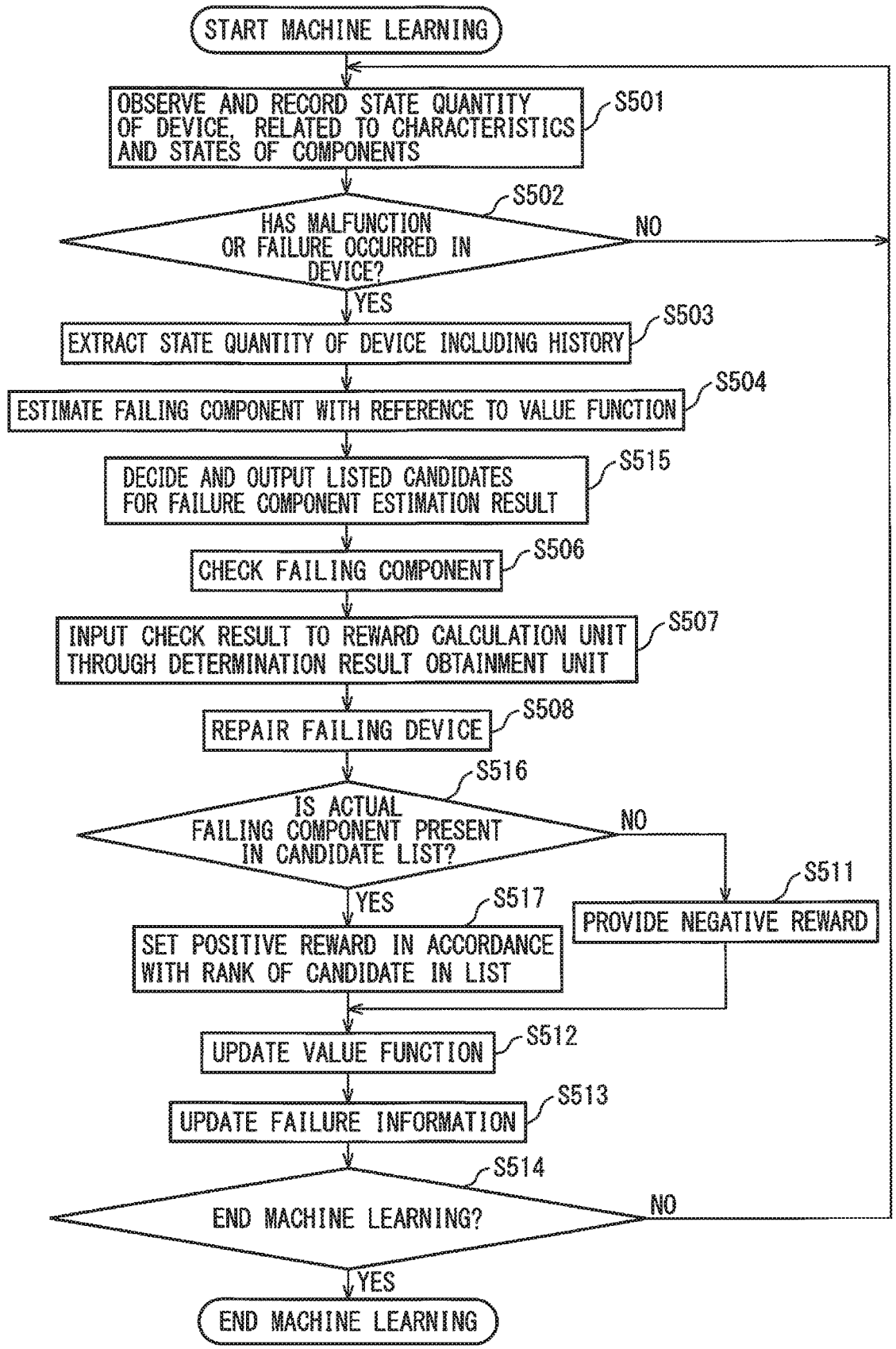
FIG. 19 is a flowchart showing another example of the operation of the machine learning device in the inventory management system shown in FIG. 17.

FIG. 19 is a flowchart showing an example of the operation of listing a plurality of candidates, as described above. Comparing FIG. 19 with FIG. 18, steps S505, S509 and S510 of FIG. 18 are replaced with steps S515, S516 and S517 of FIG. 19, respectively.

Listing the plurality of candidates for the failure component estimation result to be outputted from the fourth machine learning device 4-4 has the effect of further improving learning effects with a lower number of failures. Furthermore, even if the first candidate is wrong, the next candidate can be immediately checked, and thus it is possible to reduce the risk of requiring a long time for the apparatus to recover due to an inability to identify a failing component.

The inventory management system 1 shown in FIG. 17 learns a failure diagnostic ability by reinforcement learning, which updates a value function with the objective of maximizing a total reward in the future. However, another machine learning method may be used to learn the failure diagnostic ability, instead of reinforcement learning.

In each of the embodiments described above, the first machine learning device 4-1, the second machine learning device 4-2, the third machine learning device 4-3, the fourth machine learning device 4-4 and the like are provided separately in the inventory management system 1, but the machine learning devices do not necessarily constitute different hardware units. A single machine learning device may be constituted of at least one of the first to fourth machine learning devices 4-1 to 4-4.

In FIGS. 10, 13 and 17, the machine learning device (4-1, 4-3 and 4-4) independent of the information management device 2 is connected to the information management device 2, but the present invention is not limited thereto. At least one of the first to fourth machine learning devices 4-1 to 4-4 may be installed in the information management device 2, a server or a computer connected to the information management device 2, or any of the apparatuses 3.

Figure 20:
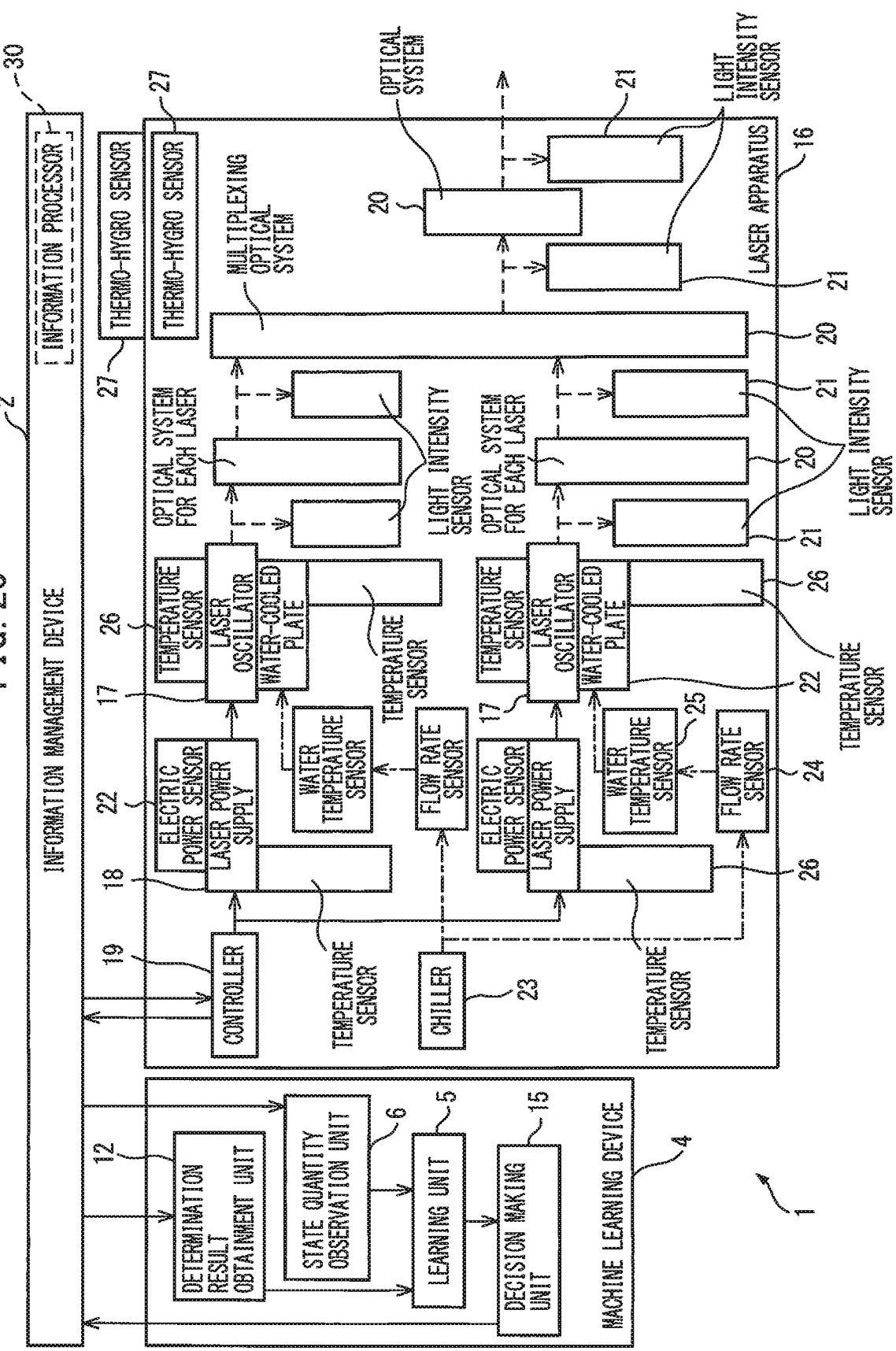
FIG. 20 is a block diagram showing the schematic configuration of an inventory management system according to yet another embodiment.

FIG. 20 is a block diagram showing the schematic configuration of an inventory management system 1 according to a yet another embodiment.

In the inventory management system 1 shown in FIG. 20, at least one of a plurality of apparatuses connected to an information management device 2 is a laser apparatus 16 having laser oscillators 17, and at least one of the first to fourth machine learning devices 4-1 to 4-4 (for example, a machine learning device 4) is connected to the information management device 2. In FIG. 20, solid line arrows indicate information or electrical transfer. Broken line arrows indicate light beams. Alternate long and short dashed line arrows indicate a part of a flow of cooling water for cooling the laser oscillators 17. A controller 19 supplies and receives information to and from each component and various sensors constituting the laser apparatus, though this is omitted in the drawing for the sake of brevity.

The following various state quantities may be outputted from components of the laser oscillators 17, laser power supplies 18, a controller 19, optical systems 20 and the like constituting the laser apparatus 16, various sensors such as light intensity sensors 21, electric power sensors 22, flow rate sensors 24, temperature sensors 26, a temperature/humidity sensor 27 and the like provided in the laser apparatus 16, and various sensors such as a temperature/humidity sensor 27 provided around the laser apparatus 16.

As examples of the various state quantities to be outputted, there are a laser output intensity from at least one of the laser apparatuses 16 and the laser oscillators 17, a laser output pulse condition from at least one of the laser apparatuses 16 and the laser oscillators 17, a reflected light intensity returned to at least one of the optical systems 20 and the laser apparatus 16, at least one of a drive current and a drive voltage suppled from the laser power supply 18 to the laser oscillator 17, the temperature of a component constituting the laser apparatus 16 including the laser oscillator 17, at least one of a temperature and a humidity inside the laser apparatus 16, at least one of a temperature and a humidity around the laser apparatus 16, an acceleration applied to at least one of the laser apparatus 16 and a component of the laser apparatus 16, at least one of the type of assist gas and a gas supply condition, at least one of a transmittance and an attenuation of the optical system 20, at least one of the installation position and height of the laser apparatus 16, and the like.

In the machine learning device 4 connected to the information management device 2, a state quantity observation unit 6 observes at least one of the various state quantities described above, as the state quantity of the laser apparatus 16, and a determination result obtainment unit 12 receives failure information and characteristic change information of each component constituting the laser apparatus 16. Furthermore, a learning unit 5 provided in the machine learning device 4 may learn cumulative failure rate curves and a first acceleration coefficient of components the failure sign of which is unknown in order to perform inventory management based on the sum of cumulative failure rates of the designated components having the same specifications, and may learn characteristic change curves and a second acceleration coefficient of a characteristic deteriorating component the characteristic of which gradually deteriorate by driving in order to perform inventory management and preventive maintenance on the characteristic deteriorating component. The learning unit 5 may detect a failure sign of a component the failure sign of which has not been known, and may learn a time variation in a failure occurrence probability after appearance of the detected failure sign, and the dependence of a component showing the sign on a driving condition, in order to perform inventory management and preventive maintenance of the component showing the sign. The learning unit 5 may learn a value function to determine the value of a failure component estimation result in order to increase a failure diagnostic ability to identify a failing component.

The laser apparatus 16 includes a component the failure rate and acceleration coefficient of which are difficult to calculate precisely by a test of the component by itself. For example, as to a component that may be damaged by reflected light, the failure rate of the component cannot be precisely calculated by itself. It is necessary to calculate the failure rate of the component in a state in which the component is installed in the laser apparatus 16. In the inventory management system 1 according to this embodiment, since the cumulative failure rate and the acceleration coefficient of the component are learned by machine learning in a state in which the component is installed in the laser apparatus 16, it is possible to calculate the failure rate and the acceleration coefficient of the component installed in the laser apparatus 16 with high precision. Therefore, the inventory management system according to the present invention can be beneficially applied to the laser apparatus 16.

For example, the following configuration and method are applied to a failure diagnosis of the laser apparatus 16.

The laser apparatus 16 includes the laser oscillators 17, the light intensity sensor 21 for detecting a light output from the laser apparatus 16, and the other light intensity sensors 21 each for detecting light outputs from the laser oscillators 17. The two laser oscillators 17 are shown in FIG. 20 for brevity, but the number of the laser oscillators 17 may be more.

Furthermore, the laser apparatus 16 includes the electric power sensors 22 each for detecting power supplied from the laser power supplies 18 to the laser oscillators 17, the flow rate sensors 24 and water temperature sensors 25 for detecting the flow rate and temperature of cooling water supplied from a chiller 23 for cooling water-cooled plates that are thermally connected to the laser oscillators 17, and the temperature sensors 26 for detecting the temperature of the laser oscillators 17.

The machine learning device 4 observes output values of the above-described various sensors as state quantities, to receive failure information and characteristic change information of each component constituting the laser apparatus 16. Thus, when an intended light output cannot be detected in response to an output command from the controller 19 of the laser apparatus 16, it is possible to easily make a failure diagnosis to identify which one of the laser oscillators 17, the laser power supplies 18, the chiller 23, the optical systems 20, and the sensors has failed or deteriorated.

On the other hand, it is often difficult to make a failure diagnosis of the components having no sensor, as described above, but the machine learning device 4 enables making a precise failure diagnosis using limited information from the various sensors by machine learning.

Figure 21:
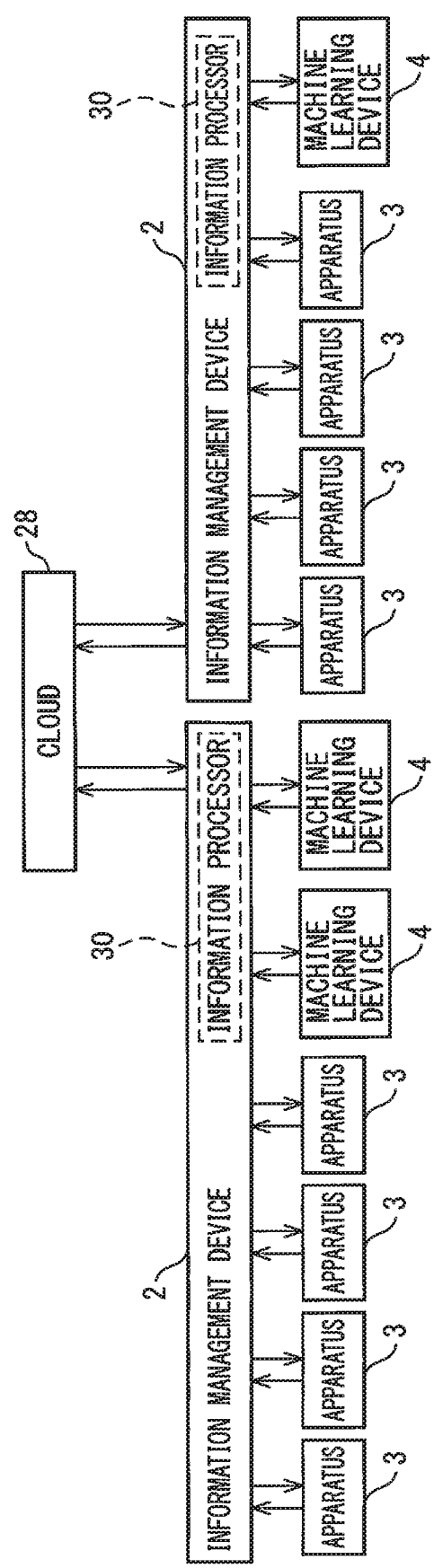
FIG. 21 is a block diagram showing the schematic configuration of an inventory management system according to yet another embodiment.

FIG. 21 is a block diagram showing the schematic configuration of an inventory management system 1 according to yet another embodiment.

In the inventory management system 1 shown in FIG. 21, a plurality of information management devices 2 are connected to each other through a cloud 28. To each information management device 2, a plurality of apparatuses 3 and at least one of the above-described first to fourth machine learning devices 4-1 to 4-4 (for example, a machine learning device 4) are connected. The machine learning devices 4 connected to the information management devices 2 share learning result information, such as the above-described learning model and value function, through the cloud 28 that the information management devices 2 are connected to. The machine learning devices 4 connected to the single information management device 2 share the learning result information, such as the above-described learning model and value function, through the information management device 2 the machine learning devices 4 are connected to.

Since the machine learning devices 4 share information such as the learning result information, it is possible to perform learning in a shorter time and obtain more reliable learning results.

Figure 22:
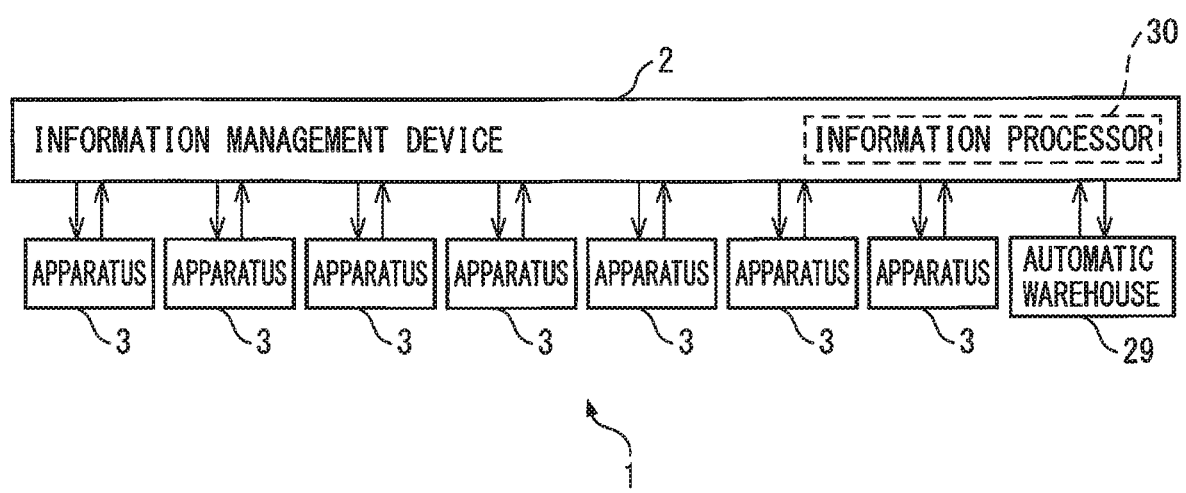
FIG. 22 is a block diagram showing the schematic configuration of an inventory management system according to yet another embodiment.

FIG. 22 is a block diagram showing the schematic configuration of an inventory management system 1 according to yet another embodiment.

In the inventory management system 1 shown in FIG. 22, an automatic warehouse 29 and a plurality of apparatuses 3 are connected to an information management device 2. In this case, arrangements for designated components are made automatically, based on at least one of inventory management information such as the appropriate inventory quantity of the designated components and preventive maintenance information on designated components, and inventory information on the automatic warehouse 29 inputted through the information management device 2. When a designated component is supplied from the automatic warehouse 29 for maintenance or an arranged component is delivered to the automatic warehouse 29, the inventory information on the automatic warehouse 29 is updated, and the information management device 2 is notified of the updated inventory information.

Since the configuration automatically makes arrangements for the necessary maintenance components in accordance with the inventory quantity of components, remaining lifetimes, and the like, it is possible to prevent an error in the arrangements. The configuration also has the advantage that the usage record of the maintenance components is fed back to the information management device 2 in real time.

Problems to be solved by one of the above various inventory management systems 1 will be described below.

Patent Document 1 (Japanese Unexamined Patent Publication (Kokai) No. 2010-113672) discloses an inventory management method in which "a process for calculating the first required inventory quantity when components showing failure signs fail at a first failure rate, a process for calculating the second required inventory quantity when components showing no failure sign yet fail at a second failure rate, and a process for calculating the required inventory quantity of the components having the failure sign by summing up the first and second required inventory quantities are performed." However, Patent Document 1 describes only a technique to calculate the required inventory quantity, based on the number of the components showing the failure signs and the failure rate of the components showing no failure sign yet. A technique to calculate the appropriate inventory quantity, for components that suddenly fail without showing any failure sign, is neither described nor suggested.

Patent Document 2 (Japanese Unexamined Patent Publication (Kokai) No. 2004-295667) discloses a replacement component prediction device including "an inventory quantity prediction unit for predicting the required inventory quantity for components, based on information about an operation time obtained by an information obtainment unit and a failure rate recorded to a failure rate recorder". However, the technique described in Patent Document 2 does not consider that when predicting the inventory quantity, the failure rate may vary depending on a driving condition. Furthermore, Patent Document 2 does not describe that when a failure rate is kept lower than a failure rate calculated from the recorded failure rate, the proportion of components used long time increases, so that the inventory quantity is required to increase, in consideration of the fact that the failure rate probably increases thereafter.

Patent Document 3 (Japanese Unexamined Patent Publication (Kokai) No. 2012-104058) discloses an inventory management device and an inventory management method in which "a failure occurrence prediction unit that predicts a failure occurrence point in time from now and the number of used components at the failure occurrence point in time, based on a failure information history", "predicts a variation in the inventory quantity of components from now, in consideration of the predicted failure occurrence point in time and the number of used components at the failure occurrence point in time". However, since the technique described in Patent Document 3 does not predict the occurrence of a failure in consideration of information about driving conditions of the components, which have effects on a failure rate of the components, the occurrence of a failure is predicted with low precision.

Even if an average variation in a failure rate of a component provided in an apparatus depending on a drive time is known to some degree, the failure rate generally changes in accordance with a driving condition, and hence it is extremely difficult to predict the time of failure of the component, especially when a failure sign is uncertain. Even if the time of failure is difficult to predict, excessive inventory, i.e., stocking up on too many expensive components, is uneconomical. On the other hand, insufficient inventory quantity hinders immediate replacement of a failing component, and causes stopping of an apparatus until a delivery of the failing component. When the apparatus is production equipment, the excessive inventory causes an increase in manufacturing cost, while the insufficient inventory causes a stoppage of production using the apparatus and a significant delay in a production plan, thus resulting in a significant loss.

As described above, both of the excessive inventory and the insufficient inventory are problems. Therefore, a first object is to develop an inventory management system that can grasp the appropriate inventory quantity, in consideration of a variation in a failure rate depending on a driving condition of a component, for components the times of failure of which are difficult to predict because the components fail without showing a certain failure sign, or components that fail in a failure mode showing no failure signs or an unknown failure sign, out of components shared between a plurality of apparatuses.

Some components have characteristics that gradually deteriorate by driving. When the characteristic of a component reaches a predetermined reference value, the component needs to be replaced. As to the components having gradually deteriorating characteristics by driving (i.e., characteristic deteriorating components), an inventory management system has to manage the appropriate inventory quantity, including maintenance components, in consideration of the time of replacement predicted by a characteristic deterioration rate having the effect of a driving condition. The characteristic deteriorating component is preferably replaced in a planned manner before the component fails, in order to prevent a malfunction in an apparatus before it happens.

Furthermore, the failure rate and an influence of the various driving conditions on the failure rate, or the characteristic deterioration rate and an influence of the various driving conditions on the characteristic deterioration rate are not always known, but are sometimes unknown or have insufficient precision, though they are known to some degree. In this case, manually establishing information with high precision requires enormous man hours. Thus, a second object is to provide an inventory management system that can establish information and data required for appropriate inventory management and preventive maintenance, as automatically as possible by machine learning.

As to failures showing no failure signs, failure signs might be overlooked. When a failure sign is found out in an automatic search, information related to a failure rate after the appearance of the failure sign is preferably automatically collected and reflected in inventory management and preventive maintenance, in order to establish a more reliable and precise inventory management system.

Furthermore, when an apparatus malfunctions, identification of a failing component to be replaced facilitates recovery of the apparatus in a shorter time, and establishing information and data required for appropriate inventory management and preventive maintenance, by collecting failure information of the component without the help of a human. Thus, a third object is to provide an inventory management system having such a diagnostic function.

As described above, one of the above embodiments proposes an inventory management system 1 that can perform appropriate inventory management and preventive maintenance of components shared between apparatuses 3 connected in an information management device 2, on both of a failure showing no certain failure signs and a failure showing a sign of characteristic deterioration, in consideration of the dependence of a failure rate on a driving condition. Another embodiment proposes an inventory management system 1 that performs machine learning to enable more appropriate inventory management and preventive maintenance.

Furthermore, an inventory management system 1 according to this disclosure manages the inventory quantity for each type of components having the same specifications used in a plurality of apparatuses under inventory management and preventive maintenance, based on the sum of cumulative failure rates, which is the sum of cumulative failure rates of all components in consideration of an acceleration coefficient depending on a driving condition of each component, thus enabling appropriate inventory management with high precision in consideration of a failure showing no certain failure signs.

As to characteristic deteriorating components, remaining lifetime is estimated from a deterioration rate and an acceleration coefficient of the deterioration rate depending on a driving condition to perform inventory management, and replacement of the component is recommended as preventive maintenance, before the component comes to the end of its lifetime.

In general, information about a time variation in a cumulative failure rate and an acceleration coefficient of the cumulative failure rate depending on a driving condition, information about a time variation in a deterioration rate and an acceleration coefficient of the deterioration rate depending on a driving condition, and information indicating the relation between a malfunction state and a failing portion of an apparatus are not sufficiently accumulated in a database. Therefore, the inventory management system 1 according to this disclosure repeatedly learns the information by machine learning, and improves the reliability of the information, thus enabling more appropriate inventory management and preventive maintenance.

The present invention is described above using the preferred embodiments, but it is apparent for those skilled in the art that the above embodiments can be variously modified, omitted or added without deviating from the scope of the present invention.

To achieve at least one of the objects of this disclosure, various aspects and effects thereof are provided as follows.

For example, a first aspect of this disclosure provides an inventory management system that includes a plurality of apparatuses, and an information management device connected to the apparatuses. The apparatuses each have replaceable common components shareable between the apparatuses, and the common components having the same specifications used in the apparatuses are designated as components under inventory management.

The inventory management system further includes an information processor for calculating the sum of cumulative failure rates that is the sum value of the cumulative failure rates of all of the designated components having the same specifications used in the apparatuses at a certain point in time, in consideration of an acceleration depending on a driving condition with respect to a standard cumulative failure rate of each type of the designated components having the same specifications used in the apparatuses under a standard driving condition, and calculating the appropriate inventory quantity of the designated components at the certain point in time based on the calculated sum of the cumulative failure rates.

According to the first aspect, since the inventory quantity of components under inventory management is managed based on the sum of cumulative failure rates in consideration of accelerations depending on driving conditions, it is possible to perform appropriate inventory management in consideration of failures showing no signs, thus preventing the occurrence of a delay in a recovery (maintenance) owing to a failure repair with insufficient inventory, while preventing excessive inventory.

A second aspect of this disclosure provides the inventory management system according to the first aspect, wherein when the designated components having the same specifications used in the apparatuses includes at least one characteristic deteriorating component that has a characteristic gradually degrading by driving and which needs to be replaced when the characteristic reaches a predetermined reference value, the information processor estimates the time of replacement of the characteristic deteriorating component, based on the characteristic of the characteristic deteriorating component at a certain point in time, and a deterioration rate of the characteristic in consideration of an acceleration depending on a driving condition with respect to a standard deterioration rate of the characteristic of the characteristic deteriorating component under the standard driving condition, and calculates the appropriate inventory quantity of the designated components in consideration of the time of replacement.

According to the second aspect, as to a characteristic deteriorating component the characteristic of which gradually deteriorates, the inventory quantity of the characteristic deteriorating component is managed in consideration of the time of replacement, which is estimated based on the characteristic at a certain point in time and a characteristic deterioration rate in consideration of an acceleration depending on a driving condition, thus enabling more appropriate inventory management.

A third aspect of this disclosure provides the inventory management system according to the second aspect, wherein the information processor issues preventive maintenance information to recommend replacement of the characteristic deteriorating component, before the characteristic of the characteristic deteriorating component reaches the predetermined reference value at which the characteristic deteriorating component is in need of replacement.

According to the third aspect, as to a component the characteristic of which deteriorates conspicuously, replacement is recommended before the deteriorating characteristic reaches a reference value at which the characteristic deteriorating component is in need of replacement, so that a failure is prevented in an apparatus before it happens, thus enabling appropriate preventive maintenance.

A fourth aspect of this disclosure provides the inventory management system according to the first aspect, further including at least one first machine learning device connected to the information management device.

The first machine learning device includes:

a state quantity observation unit for observing outputs from components constituting the apparatuses and outputs from at least one of a variety of sensors provided in the apparatuses and a variety of sensors provided around the apparatuses, as state quantities of the apparatuses, in relation to the driving condition and states of the designated components;

a result obtainment unit for obtaining failure information occurring in the apparatuses; and a first learning unit for learning a standard cumulative failure rate curve representing a time variation in the cumulative failure rate of the designated component under the standard driving condition, and a first acceleration coefficient representing an acceleration ratio of the cumulative failure rate depending on the driving condition with respect to the standard cumulative failure rate of the designated component under the standard driving condition, in association with the state quantity of the apparatuses observed by the state quantity observation unit and the failure information observed by the result obtainment unit, wherein the information processor calculates the sum of the cumulative failure rates, with reference to the standard cumulative failure rate curve of the designated component under the standard driving condition and the first acceleration coefficient learned by the first learning unit.

According to the fourth aspect, the following effects are obtained. In most cases, a standard cumulative failure rate and an acceleration coefficient of a cumulative failure rate depending on a driving condition are not known for all of designated components. Manually calculating the standard cumulative failure rate and the first acceleration coefficient requires enormous man hours, but using machine learning to obtain the standard cumulative failure rate and the first acceleration coefficient does not require man hours basically. Even if the standard cumulative failure rate and the first acceleration coefficient are known, the standard cumulative failure rate and the first acceleration coefficient are often calculated by an acceleration lifetime test using a relatively small number of samples, and do not always have high precision. By the repetition of machine learning, the standard cumulative failure rate and the first acceleration coefficient can be obtained with higher precision, and the sum of cumulative failure rates is calculated with increased precision, thus enabling more appropriate inventory management.

A fifth aspect of this disclosure provides the inventory management system according to the second aspect or the third aspect, further including at least one second machine learning device connected to the information management device.

The second machine learning device includes:

a state quantity observation unit for observing an output from a component constituting the apparatus and outputs from at least one of a variety of sensors provided in the apparatus and a variety of sensors provided around the apparatus, as state quantity of the apparatus, in relation to the driving condition and characteristic of the characteristic deteriorating component;

a result obtainment unit for obtaining characteristic change information on the characteristic of the characteristic deteriorating component; and a second learning unit for learning a standard characteristic change curve representing a time variation in the characteristic of the characteristic deteriorating component under the standard driving condition, and a second acceleration coefficient representing an acceleration ratio of the deterioration rate depending on the driving condition with respect to the standard characteristic change curve of the characteristic deteriorating component under the standard driving condition, in association with the state quantity of the apparatus observed by the state quantity observation unit and the characteristic change information observed by the result obtainment unit, wherein the information processor estimates the time of replacement of the characteristic deteriorating component, with reference to the standard characteristic change curve of the characteristic deteriorating component and the second acceleration coefficient learned by the second learning unit.

According to the fifth aspect, the following effects are obtained. As to a component the characteristic of which deteriorates by driving an apparatus, a standard characteristic change curve and a second acceleration coefficient of the component are often calculated by an acceleration lifetime test using a relatively small number of samples. In most cases, a deterioration rate and acceleration coefficients of the deterioration rate depending on various driving conditions are not known with high precision. However, by the repetition of machine learning, the characteristic change curve under a standard driving condition and the acceleration coefficient depending on the driving condition can be obtained with higher precision, thus enabling more appropriate inventory management.

The sixth aspect of this disclosure provides the inventory management system according to the first or fourth aspect, further including at least one third machine learning device connected to the information management device.

The third machine learning device includes:

a state quantity observation unit for observing outputs from components constituting the apparatuses and outputs from at least one of a variety of sensors provided in the apparatuses and a variety of sensors provided around the apparatuses, as state quantities of the apparatuses, in relation to the driving condition and characteristics of the designated components; and a third learning unit that, whenever receiving a result indicating the occurrence of a failure in the designated components except for the characteristic deteriorating component, collects state quantity data on the apparatuses having the failing designated components observed by the state quantity observation unit, between the time when a predetermined time precedes the occurrence of the failure and the time of occurrence of the failure, on the basis of the type of the designated components having the same specifications, and extracts a feature that is different from the state quantities of the non-failing designated components from the collected pre-failing data, to search for a failure sign.

According to the sixth aspect, a failure sign can be detected by unsupervised learning. Unsupervised learning generally learns the distribution of input data, and extracts an essential configuration behind the data, without requiring corresponding output data (training data). Therefore, by collecting state quantity data on apparatuses having failing designated components between the time when a predetermined time precedes the occurrence of a failure and the time of the occurrence of the failure, as the input data for unsupervised learning, an unknown failure sign of the failing designated components may be found out.

A seventh aspect of this disclosure provides the inventory management system according to the sixth aspect, wherein when the extracted feature is recognized as the failure sign, the third learning unit learns a failure occurrence probability distribution relative to time, and the dependence of the failure occurrence probability distribution relative to time on the driving condition, in association with the state of the failure sign, the state quantity data of the device related to the driving condition of the failing designated component between the appearance of the failure sign and the occurrence of the failure, and a driving time between the appearance of the failure sign and the actual occurrence of the failure, until the designated component showing the failure sign actually fails, the third learning unit issues preventive maintenance information to recommend replacement of the designated component showing the failure sign, and issues failure occurrence prediction information on the designated component showing the failure sign, with reference to a learning result, and the information processor estimates the appropriate inventory quantity for the designated components in consideration of the failure occurrence prediction information.

According to the seventh aspect, when an unknown failure sign is found out, the time of occurrence of a failure can be estimated by machine learning. Therefore, it is possible to prepare a maintenance component and replace a failing component before the occurrence of the failure in consideration of the failure sign, thus enabling more appropriate inventory management.

An eighth aspect of this disclosure provides the inventory management system according to any one of the first to seventh aspects, further including at least one fourth machine learning device connected to the information management device.

The fourth machine learning device includes:

a state quantity observation unit for observing outputs from components constituting the apparatuses and outputs from at least one of a variety of sensors provided in the apparatuses and a variety of sensors provided around the apparatuses, as state quantities of the apparatuses, in relation to the driving condition and states or characteristics of the designated components;

a determination result obtainment unit for obtaining a determination result related to right and wrong of an estimation result as to a failing designated component, in the apparatus having the failing designated component;

a fourth learning unit for receiving an output from the state quantity observation unit and an output from the determination result obtainment unit, and learning the estimation result as to the failing designated component, in association with the state quantity of the apparatus and the estimation result as to the failing designated component obtained by the determination result obtainment unit; and a decision making unit for determining the estimation result as to the failing designated component to be outputted from the fourth machine learning device, with reference to the learning result by the fourth learning unit, wherein the fourth learning unit has a value function to determine the value of the estimation result as to the failing designated component, and the fourth learning unit includes a reward calculation unit for providing a positive reward when the estimation result is right, while providing a negative reward when the estimation result is wrong, and a value function update unit for updating the value function in accordance with the reward, and the information processor makes a failure diagnosis of the apparatuses, with reference to a learning result of the fourth learning unit.

According to the eighth aspect, when an apparatus fails, a failing component can be estimated in the failing apparatus, by the repetition of machine learning. Thus, the failing apparatus can be recovered in a short time. Furthermore, failing information on the apparatus can be automatically obtained without the help of a human.

A ninth aspect of this disclosure provides the inventory management system according to the eighth aspect, wherein the estimation result as to the failing designated component to be outputted from the fourth machine learning device includes not only a first candidate having the highest probability, but also a plurality of candidates that are listed in decreasing order of probability, and the higher ranked the candidate of the plurality of candidates the actual failing designated component coincides with, the larger positive reward the reward calculation unit provides, while when the actual failing component coincides with none of the listed candidates, the reward calculation unit provides the negative reward.

According to the ninth aspect, higher learning effects can be obtained with a small number of failures. Furthermore, even if a first candidate is wrong, the next candidate can be immediately checked, so it is possible to reduce the probability of requiring a long time for the apparatus to recover, because of an inability to identify a failing component.

A tenth aspect of this disclosure provides the inventory management system according to any one of the fourth to ninth aspects, wherein at least one of the apparatuses connected to the information management device is a laser apparatus having a laser oscillator, at least one machine learning device of the first machine learning device, the second machine learning device, the third machine learning device, and the fourth machine learning device is connected to the information management device, and at least one of a laser output intensity from at least one of the laser apparatus and the laser oscillator, a laser output pulse condition from at least one of the laser apparatus and the laser oscillator, a reflected light intensity returned to at least one of an optical system constituting the laser apparatus and the laser apparatus, at least one of a drive current and a drive voltage suppled from a laser power supply constituting the laser apparatus to the laser oscillator, the temperature of a component constituting the laser apparatus including the laser oscillator, at least one of the temperature and humidity inside the laser apparatus, at least one of the temperature and humidity around the laser apparatus, an acceleration applied to at least one of the laser apparatus and a component of the laser apparatus, at least one of the type of assist gas and a gas supply condition, at least one of the transmittance and attenuation of the optical system, and at least one of the installation position and height of the laser apparatus is outputted from a component constituting the laser apparatus or at least one of a variety of sensors provided in the laser apparatus and a variety of sensors provided around the laser apparatus, as the state quantity of the laser apparatus, and the at least one machine learning device observes the state quantity.

According to the tenth aspect, since the cumulative failure rate and the acceleration coefficient of a component is learned in a state in which the component is installed in the laser apparatus, it is possible to calculate the failure rate and the acceleration coefficient of the component installed in the laser apparatus with high precision.

An eleventh aspect of this disclosure provides the inventory management system according to any one of the fourth to tenth aspects, wherein a plurality of the information management devices are connected to each other through a cloud, the plurality of apparatuses and at least one machine learning device is connected to each of the information management devices, and the machine learning devices connected to the information management devices share learning result information through the information management device or the cloud that the information management devices are connected to.

According to the eleventh aspect, since the machine learning devices share information about learning results such as a learning model and a value function, it is possible to perform learning to obtain information such as a cumulative failure rate, an acceleration coefficient depending on a driving condition, and a characteristic deterioration rate, which are required to estimate the inventory quantity of designated components, in a shorter time.

A twelfth aspect of this disclosure provides the inventory management system according any one of the first to eleventh aspects, further including an automatic warehouse connected to the information management device.

The information processor automatically makes arrangements for the designated component, based on at least one of inventory management information including the appropriate inventory quantity of the designated components and preventive maintenance information on the designated components, and inventory information on the automatic warehouse inputted through the information management device.

According to the twelfth aspect, since the information processor automatically makes arrangements for the necessary maintenance components, it is possible to prevent an error in the arrangements, and the usage record of a maintenance component is fed back to the information management device in real time.

The invention claimed is:

1. An inventory management system, comprising:
a plurality of apparatuses;
an information management device configured to manage information to be supplied to or received from the apparatuses, the apparatuses each having replaceable common components shareable between the apparatuses, the common components having the same specifications used in the apparatuses being designated as components under inventory management; and
an information processor configured to
calculate the sum of cumulative failure rates that is the sum of the cumulative failure rates of all of the designated components having the same specifications used in the apparatuses at a certain point in time, in consideration of an acceleration depending on a driving condition with respect to a standard cumulative failure rate of each type of the designated components having the same specifications used in the apparatuses under a standard driving condition, and
calculate the appropriate inventory quantity of the designated components at the certain point in time based on the calculated sum of the cumulative failure rates,
wherein the information management device is further configured to
determine whether or not an actual inventory quantity of the designated components is less than the calculated appropriate inventory quantity, and
issue, to an external device, a notification recommending arrangements for a required inventory quantity of the designated components, in response to a determination that the actual inventory quantity is less than the calculated appropriate inventory quantity.

2. The inventory management system according to claim 1, wherein when the designated components having the same specifications used in the apparatuses includes at least one characteristic deteriorating component that has a characteristic gradually degrading by driving and which needs to be replaced when the characteristic reaches a predetermined reference value, the information processor estimates the time of replacement of the characteristic deteriorating component, based on the characteristic of the characteristic deteriorating component at a certain point in time, and a deterioration rate of the characteristic in consideration of an acceleration depending on a driving condition with respect to a standard deterioration rate of the characteristic of the characteristic deteriorating component under the standard driving condition, and calculates the appropriate inventory quantity of the designated components in consideration of the time of replacement.

3. The inventory management system according to claim 2, wherein the information processor issues preventive maintenance information to recommend replacement of the characteristic deteriorating component, before the characteristic of the characteristic deteriorating component reaches the predetermined reference value at which the characteristic deteriorating component is in need of replacement.

4. An inventory management system, comprising:
a plurality of apparatuses;
an information management device configured to manage information to be supplied to or received from the apparatuses, the apparatuses each having replaceable common components shareable between the apparatuses, the common components having the same specifications used in the apparatuses being designated as components under inventory management;
an information processor configured to
calculate the sum of cumulative failure rates that is the sum of the cumulative failure rates of all of the designated components having the same specifications used in the apparatuses at a certain point in time, in consideration of an acceleration depending on a driving condition with respect to a standard cumulative failure rate of each type of the designated components having the same specifications used in the apparatuses under a standard driving condition, and
calculate the appropriate inventory quantity of the designated components at the certain point in time based on the calculated sum of the cumulative failure rates; and
at least one first machine learning device connected to the information management device, wherein
the first machine learning device includes:
a state quantity observation unit for observing outputs from components constituting the apparatuses and outputs from at least one of a variety of sensors provided in the apparatuses and a variety of sensors provided around the apparatuses, as state quantities of the apparatuses, in relation to the driving condition and states of the designated components;
a result obtainment unit for obtaining failure information occurring in the apparatuses; and
a first learning unit for learning a standard cumulative failure rate curve representing a time variation in the cumulative failure rate of the designated component under the standard driving condition, and a first acceleration coefficient representing an acceleration ratio of the cumulative failure rate depending on the driving condition with respect to the standard cumulative failure rate of the designated component under the standard driving condition, in association with the state quantity of the apparatuses observed by the state quantity observation unit and the failure information observed by the result obtainment unit, wherein
the information processor calculates the sum of the cumulative failure rates, with reference to the standard cumulative failure rate curve of the designated component under the standard driving condition and the first acceleration coefficient learned by the first learning unit.

5. The inventory management system according to claim 2, further comprising:
at least one second machine learning device connected to the information management device, wherein
the second machine learning device includes:
a state quantity observation unit for observing an output from a component constituting the apparatus and outputs from at least one of a variety of sensors provided in the apparatus and a variety of sensors provided around the apparatus, as state quantity of the apparatus, in relation to the driving condition and characteristic of the characteristic deteriorating component;
a result obtainment unit for obtaining characteristic change information on the characteristic of the characteristic deteriorating component; and
a second learning unit for learning a standard characteristic change curve representing a time variation in the characteristic of the characteristic deteriorating component under the standard driving condition, and a second acceleration coefficient representing an acceleration ratio of the deterioration rate depending on the driving condition with respect to the standard characteristic change curve of the characteristic deteriorating component under the standard driving condition, in association with the state quantity of the apparatus observed by the state quantity observation unit and the characteristic change information observed by the result obtainment unit, wherein
the information processor estimates the time of replacement of the characteristic deteriorating component, with reference to the standard characteristic change curve of the characteristic deteriorating component and the second acceleration coefficient learned by the second learning unit.

6. The inventory management system according to claim 1, further comprising:
at least one third machine learning device connected to the information management device, wherein
the third machine learning device includes:
a state quantity observation unit for observing outputs from components constituting the apparatuses and outputs from at least one of a variety of sensors provided in the apparatuses and a variety of sensors provided around the apparatuses, as state quantities of the apparatuses, in relation to the driving condition and characteristics of the designated components; and
a third learning unit that, whenever receiving a result indicating the occurrence of a failure in the designated components except for a characteristic deteriorating component that has a characteristic gradually deteriorating by driving, collects state quantity data on the apparatuses having the failing designated components observed by the state quantity observation unit, between the time when a predetermined time precedes the occurrence of the failure and the time of the occurrence of the failure, on the basis of the type of the designated components having the same specifications, and extracts a feature that is different from the state quantities of the non-failing designated components from the collected pre-failing data, to search for a failure sign.

7. The inventory management system according to claim 6, wherein when the extracted feature is recognized as the failure sign, the third learning unit learns a failure occurrence probability distribution relative to time, and the dependence of the failure occurrence probability distribution relative to time on the driving condition, in association with the state of the failure sign, the state quantity data of the apparatus related to the driving condition of the failing designated component between the appearance of the failure sign and the occurrence of the failure, and a driving time between the appearance of the failure sign and the actual occurrence of the failure,
until the designated component showing the failure sign actually fails, the third learning unit issues preventive maintenance information to recommend replacement of the designated component showing the failure sign, and issues failure occurrence prediction information on the designated component showing the failure sign, with reference to a learning result, and the information processor estimates the appropriate inventory quantity of the designated components in consideration of the failure occurrence prediction information.

8. The inventory management system according to claim 1, further comprising:
at least one fourth machine learning device connected to the information management device, wherein
the fourth machine learning device includes:
a state quantity observation unit for observing outputs from components constituting the apparatuses and outputs from at least one of a variety of sensors provided in the apparatuses and a variety of sensors provided around the apparatuses, as state quantities of the apparatuses, in relation to the driving condition and states or characteristics of the designated components;
a determination result obtainment unit for obtaining a determination result related to right and wrong of an estimation result as to a failing designated component, in the apparatus having the failing designated component;
a fourth learning unit for receiving an output from the state quantity observation unit and an output from the determination result obtainment unit, and learning the estimation result as to the failing designated component, in association with the state quantity of the apparatus and the estimation result as to the failing designated component obtained by the determination result obtainment unit; and
a decision making unit for deciding the estimation result as to the failing designated component to be outputted from the fourth machine learning device, with reference to the learning result by the fourth learning unit, wherein
the fourth learning unit has a value function to determine the value of the estimation result as to the failing designated component, and the fourth learning unit includes a reward calculation unit for providing a positive reward when the estimation result is right, while providing a negative reward when the estimation result is wrong, and a value function update unit for updating the value function in accordance with the reward, and
the information processor makes a failure diagnosis of the apparatuses, with reference to a learning result of the fourth learning unit.

9. The inventory management system according to claim 8, wherein the estimation result as to the failing designated component to be outputted from the fourth machine learning device includes not only a first candidate having the highest probability, but also a plurality of candidates that are listed in decreasing order of probability, and
the higher ranked candidate of the plurality of candidates the actual failing designated component coincides with, the larger positive reward the reward calculation unit provides, while when the actual failing component coincides with none of the listed candidates, the reward calculation unit provides the negative reward.

10. The inventory management system according to claim 4, wherein at least one of the apparatuses connected to the information management device is a laser apparatus having a laser oscillator, and
at least one of a laser output intensity from at least one of the laser apparatus and the laser oscillator, a laser output pulse condition from at least one of the laser apparatus and the laser oscillator, a reflected light intensity returned to at least one of an optical system constituting the laser apparatus and the laser apparatus, at least one of a drive current and a drive voltage suppled from a laser power supply constituting the laser apparatus to the laser oscillator, the temperature of a component constituting the laser apparatus including the laser oscillator, at least one of the temperature and humidity inside the laser apparatus, at least one of the temperature and humidity around the laser apparatus, an acceleration applied to at least one of the laser apparatus and a component of the laser apparatus, at least one of the type of assist gas and a gas supply condition, at least one of the transmittance and attenuation of the optical system, and at least one of the installation position and height of the laser apparatus is outputted from a component constituting the laser apparatus or at least one of a variety of sensors provided in the laser apparatus and a variety of sensors provided around the laser apparatus, as the state quantity of the laser apparatus, and the state quantity observation unit observes the state quantity.

11. The inventory management system according to claim 4, wherein
a plurality of the information management devices are connected to each other through a cloud,
the plurality of apparatuses and at least one machine learning device is connected to each of the information management devices, and
the machine learning devices connected to the information management devices share learning result information through the information management device or the cloud that the information management devices are connected to.

12. An inventory management system, comprising:
a plurality of apparatuses;
an information management device configured to manage information to be supplied to or received from the apparatuses, the apparatuses each having replaceable common components shareable between the apparatuses, the common components having the same specifications used in the apparatuses being designated as components under inventory management;
an information processor configured to
calculate the sum of cumulative failure rates that is the sum of the cumulative failure rates of all of the designated components having the same specifications used in the apparatuses at a certain point in time, in consideration of an acceleration depending on a driving condition with respect to a standard cumulative failure rate of each type of the designated components having the same specifications used in the apparatuses under a standard driving condition, and
calculate the appropriate inventory quantity of the designated components at the certain point in time based on the calculated sum of the cumulative failure rates; and
an automatic warehouse connected to the information management device, wherein
the information processor automatically makes arrangements for the designated component, based on
information of at least one of
inventory management information including the appropriate inventory quantity of the designated components, and
preventive maintenance information that recommends replacement of a characteristic deteriorating component that has a characteristic gradually deteriorating by driving in the designated components or preventive maintenance information that recommends replacement of the designated component showing a failure sign, and inventory information on the automatic warehouse inputted through the information management device.

13. The inventory management system according to claim 1, wherein the information processor is configured to calculate the appropriate inventory quantity as the sum of estimated cumulative failure rates that is the sum of cumulative failure rates after a lapse of a delivery time of the designated components, or as a number obtained by adding a predetermined margin to the sum of the estimated cumulative failure rates, or as a number obtained by multiplying the sum of the estimated cumulative failure rates by a predetermined ratio.

* * * * *